United States Patent
Imaizumi et al.

(10) Patent No.: US 6,330,076 B1
(45) Date of Patent: *Dec. 11, 2001

(54) IMAGE PROCESSING APPARATUS

(75) Inventors: Shoji Imaizumi, Shinshiro; Kazuomi Sakatani, Toyohashi, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,664

(22) Filed: Oct. 31, 1997

Related U.S. Application Data

(63) Continuation of application No. 08/660,863, filed on Jun. 10, 1996.

(30) Foreign Application Priority Data

Jun. 15, 1995 (JP) .................................................. 7-148734

(51) Int. Cl.⁷ ........................... H04N 11/20; H04N 11/02; G06K 15/06
(52) U.S. Cl. ............................. 358/1.9; 348/393; 348/450
(58) Field of Search ........................ 358/509, 515, 358/516, 517, 518, 519, 520, 523, 530; 348/234, 235, 236, 393, 396, 397, 395, 403, 405, 444, 450, 663; 382/166, 167, 232

(56) References Cited

U.S. PATENT DOCUMENTS

| 4,857,993 | * | 8/1989 | Music et al. .............................. 358/13 |
| 4,897,734 | * | 1/1990 | Sato et al. .............................. 358/448 |
| 5,339,368 | * | 8/1994 | Higgins-Luthman .................. 382/41 |
| 5,384,601 | * | 1/1995 | Yamashita et al. ................... 348/577 |
| 5,487,172 | * | 1/1996 | Hyatt .................................... 395/800 |
| 5,488,670 | * | 1/1996 | Suzuki et al. ......................... 382/165 |
| 5,539,539 | * | 7/1996 | Fujimoto et al. ..................... 358/518 |
| 5,576,845 | * | 11/1996 | Komatsu ............................... 358/433 |
| 5,585,944 | * | 12/1996 | Rodriquez ............................. 358/500 |
| 5,959,696 | * | 9/1999 | Hwang .................................. 348/678 |
| 5,999,206 | * | 12/1999 | Inoue et al. ........................... 347/251 |
| 6,043,445 | * | 3/2000 | Gigliotti, Jr. et al. ................ 209/580 |
| 6,064,367 | * | 5/2000 | Horioka ................................ 345/155 |
| 6,118,793 | * | 9/2000 | Chen .................................... 370/470 |

FOREIGN PATENT DOCUMENTS

| 4-10771 | | 1/1992 | (JP) | .................................. B41J/3/00 |
| 11065512A | * | 3/1999 | (JP) | .................................. G09G/3/20 |
| 2001067038 | * | 3/2001 | (JP) | .................................. G09G/3/20 |
| 03210593 | * | 9/1991 | (JP) | .................................. G09G/5/00 |

* cited by examiner

Primary Examiner—Jerome Grant
(74) Attorney, Agent, or Firm—Burns, Doane, Swecker & Mathis, LLP

(57) ABSTRACT

An image processing apparatus has a data conversion unit which converts RGB image data of a document to luminance component and chromaticity component, an optimization process unit which converts the distribution state of the luminance component data and chromaticity component data so as to achieve a distribution from a minimum value to a maximum value of the data within a color space, an encoding process unit which encodes data of each pixel as code data obtained by quantization at a gradient level less than the data within a range of gradient distribution based on mean value information, a memory which stores mean value information, gradient range exponent, and code data of each block obtained by the encoding process in the encoding unit, a decoding process unit which decodes code data in block units based on the mean value information and gradient range exponent stored in the memory, and reverse optimization process unit which returns the distribution state of data of the luminance component and chromaticty component decoded in the decoding process unit to a state prior to conversion in the optimization process unit.

28 Claims, 31 Drawing Sheets

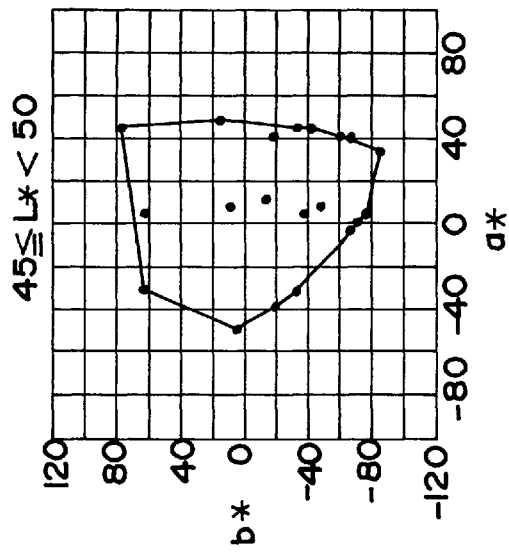
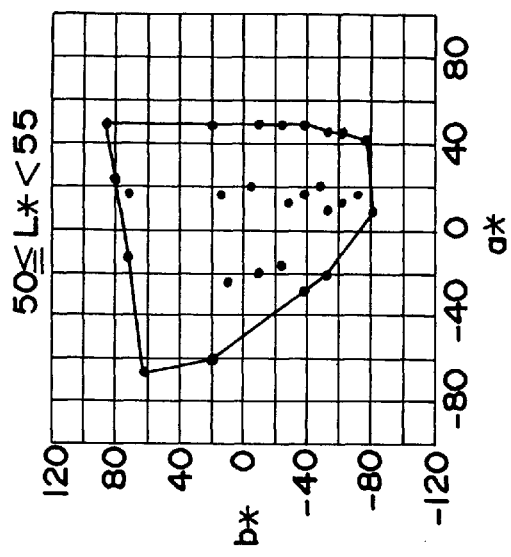
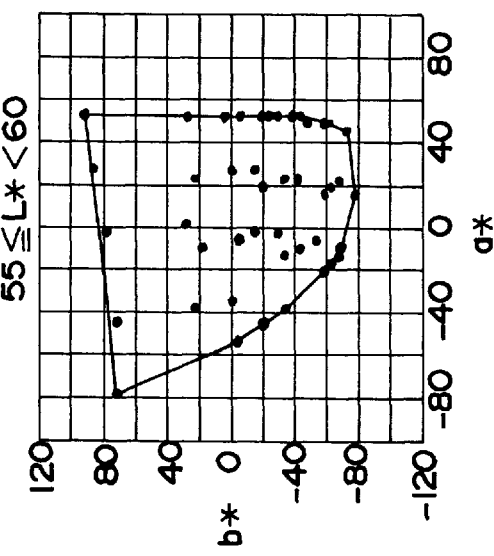
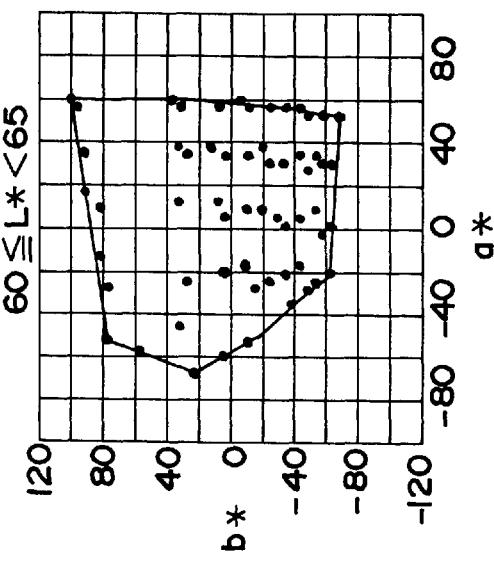

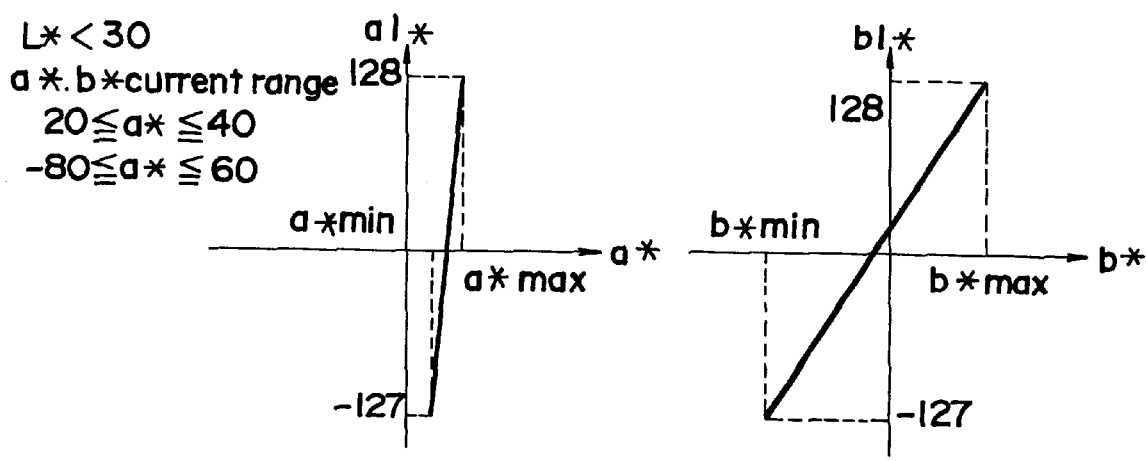

$60 \leq L* < 65$
a*.b* current range
$-70 \leq a* \leq 60$
$-70 \leq a* \leq 110$ $95 \leq L* \leq 100$
a*.b* current range
$-30 \leq a* \leq 0$
$-10 \leq a* \leq 80$ Fig. 25a    Fig. 25b    Fig. 25c
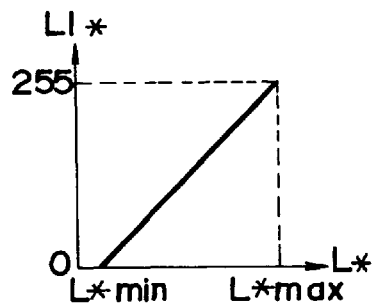 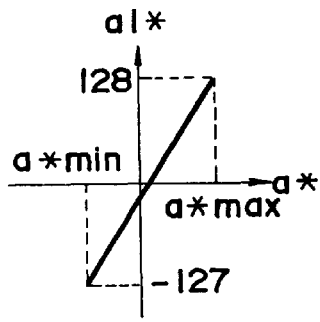 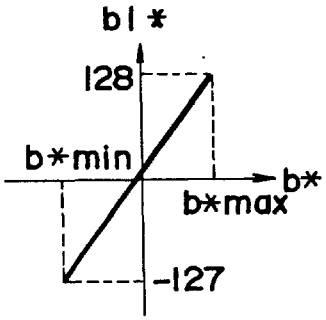
Fig. 25d
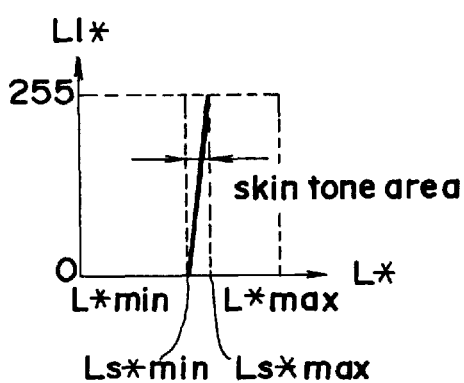
Fig. 25e
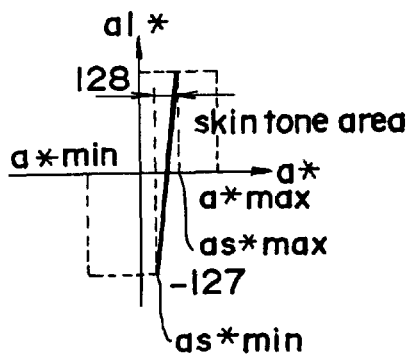
Fig. 25f
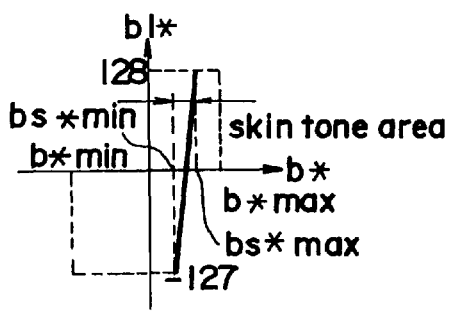

L* < 30
a*.b* current range
20 ≦ a* ≦ 40
−80 ≦ a* ≦ 60

60 ≦ L* < 65
a*.b* current range
−70 ≦ a* ≦ 60
−70 ≦ a* ≦ 110

95 ≦ L* ≦ 100
a*.b* current range
−30 ≦ a* ≦ 0
−10 ≦ a* ≦ 80

IMAGE PROCESSING APPARATUS

This application is a continuation of application Ser. No. 08/660,863, filed Jun. 10, 1996.

BACKGROUND OF THE INVENTION

1. Field of the Invention

The present invention relates to an image processing apparatus which executes compression coding of image information using a generalized block truncation coding (GBTC) method.

2. Description of the Related Art

In recent years the generalized block truncation coding method has been proposed as a method for compression/expansion of document image data. In the GBTC method, document image data are extracted for each block of a predetermined pixel matrix, and the data of each pixel within a block are compression coded as code data quantized to a gradient level smaller than said data within a range of gradient distribution within said block based on mean value information LA determined by dividing the sum of a mean value Q1 of data values below a parameter P1 determined from data within the block and a mean value Q4 of data values above a parameter P2 (where P1<P2 relationship is satisfied), and a gradient range exponent LD expressing the difference in the mean value Q1 and said mean value Q4.

FIGS. 1a through 1c illustrate the flow of a typical GBTC encoding process. In the GBTC method, image data of a document image are extracted in 4×4 pixel block units. The image data within the extracted 4×4 pixel block are subjected to an encoding process by a method described using FIGS. 2a through 2c below, and image data (16 bytes, i.e., 128 bits) of 1 byte (=8 bits) data per pixel by 16 pixels are encoded as data of a total of 6 bytes (=48 bits) of 2 byte code data by 16 pixels allocated by dividing the data of each pixel, i.e., 1 byte gradient range exponent LD, 1 bytes mean value information LA, in four levels. Thus, the data quantity is compressed ⅜. FIG. 1c shows the data quantity of the encoded image data equivalent to 6 pixels of image data prior to encoding. Decoding of the encoded data is accomplished by calculating 1 byte image data corresponding to each 2 bits of code data based on the gradient range exponent LD and mean value information LA.

FIGS. 2a through 2c show the GBTC type encoding process and decoding process. FIG. 2a shows the relationship among maximum value Lmax, minimum value Lmin, parameters P1 and P2, and gradient range exponent LD. A predetermined feature quantity required for encoding is determined from image data extracted in block units of 4×4 pixels. The feature quantity is determined by the following calculations. First, the maximum value Lmax and minimum value Lmin of each 8-bit image data within a 4×4 pixel block are detected. Then, parameter P1 is determined by adding ¼ of the difference between maximum value Lmax and minimum value Lmin to said minimum value Lmin, then parameter P2 is determined by adding ¾ of said difference to minimum value Lmin. That is, parameters P1 and P2 are determined via the calculations of Equation 1 and Equation 2 below.

$$P1=(Lmax+3Lmin)/4 \quad (1)$$

$$P2=(3Lmax+Lmin)/4 \quad (2)$$

Then, the mean value Q1 is determined for image data of pixels below parameter P1 among the image data of each pixel. Thereafter, the mean value Q4 is determined for image data of pixels above parameter P2 among the image data of each pixel. The mean value information $LA=(Q1+Q4)/2$ and gradient range exponent $LD=Q4-Q1$ are determined.

The standard values L1 and L2 are determined by the calculations of Equations 3 and 4.

$$L1=LA-LD/4 \quad (3)$$

$$L2=LA+LD/4 \quad (4)$$

The aforesaid standard values L1 and L2 are used when encoding the 1-byte (8-bits) image data of each pixel, i.e., image data of 256 gradients, to 4 gradient code data.

FIG. 2b shows the value of code data $\Phi ij$ allocated in accordance with the data value of pixel Xij of line i (where i=1, 2, 3, 4; hereinafter the same) and row j (where j=1, 2, 3, 4; hereinafter the same) within the 4×4 pixel block. More specifically, the 2-bit code data $\Phi ij$ of the values shown in Table 1 below are allocated in accordance with the value of pixel Xij.

TABLE 1

| Current range of 1-byte image data of pixel Xij at line i, row j | Allocated 2-bit code data $\Phi ij$ |
|---|---|
| $Xij \leq L1$ | $\Phi ij = 01$ |
| $L1 < Xij \leq LA$ | $\Phi ij = 00$ |
| $LA < Xij \leq L2$ | $\Phi ij = 01$ |
| $L2 < Xij$ | $\Phi ij = 11$ |

Data encoded by the GBTC method comprise code data (16×2 bits) of a 16-pixel block, and the gradient range exponent LD and mean value information LA of each 1 byte (8-bits).

The gradient range exponent LD and mean value information LA are used when decoding the encoded data, as shown in FIG. 2c. That is, the data of pixel Xij are substituted by 256 gradient data of the value shown in Table 2 in accordance with the value code data $\Phi ij$ allocated to pixel Xij of line i and row j.

TABLE 2

| Value of 2-bit code data $\Phi ij$ allocated to pixel Xij of line i, row j | Method of determining the value of substitution 256 gradient data |
|---|---|
| $\Phi ij = 01$ | $Xij = LA - LD/2 = Q1$ |
| $\Phi ij = 00$ | $Xij = LA - LD/6 = 2/3Q1 + 1/3Q4$ |
| $\Phi ij = 10$ | $Xij = LA + LD/6 = 1/3Q1 + 2/3Q4$ |
| $\Phi ij = 11$ | $Xij = LA + LD/2 = Q4$ |

The image data of pixel Xij (where i and j are respectively values among 1, 2, 3, 4) within the 4×4 pixel block are substituted by four types of values of 256-gradient data via the GBTC type encoding process and decoding process. The decoded data include obvious errors in comparison to the original document image data. These errors are difficult to discern, however, due to limitations of human visual acuity, i.e., there is virtually no discernible loss of image quality in normal images. Parameters Q1 and Q4 can be determined from the gradient range exponent LD and mean value information LA contained in the coded data. That is, a text image comprising a black color portion below parameter P1 and white color portion above parameter P2 can be reproduced from the coded data.

In the JPEG (Joint Photographic Experts Group) method of Huffman coding of data obtained by DCT (discrete cosine transform) conversion of image data, the data compression rate varies depending on the type of document. That is, although the JPEG method may realize a higher rate of data compression than the GBTC method on a particular document, the JPEG method may not be capable of any compression of another document. Thus, it is difficult to set the capacity of installed memory in image processing apparatuses using the JPEG method. On the other hand, the GBTC method is capable of compressing data at a normally constant compression rate. Therefore, image processing apparatuses using the GBTC method are advantageous in that the capacity of installed memory can be readily set.

Division is widely used in the GBTC type encoding process and decoding process, as shown in Equations 1 through 4 and Table 2 above. Reproducibility is reduced for image data obtained by the decoding process which eliminates differences among constituent data of each pixel during the calculation process when such differences are small. This factor is disadvantageous inasmuch as suitable reproductions cannot be obtained for areas wherein chromaticity and luminance change subtly as in the case of human skin tone.

SUMMARY OF THE INVENTION

In view of the previously described disadvantages, an object of the present invention is to provide an image processing apparatus for executing more suitable image compression processing of images having subtle changes of chromaticity and luminance.

This object of the invention is attained by providing:

a data conversion unit for converting RGB image data of a document to luminance component and chromaticity component;

optimization process unit for converting the distribution state of said luminance component data and chromaticity component data so as to achieve a distribution from a minimum value to a maximum value of said data within a color space based on a minimum value and maximum value of data of said luminance component and chromaticity component obtained by the data conversion unit;

encoding process unit for encoding data of each pixel within a block as code data obtained by quantization at a gradient level less than said data within a range of gradient distribution in said block based on mean value information determined by dividing data of the luminance component and chromaticity component converted by the optimization process unit into blocks comprising a predetermined pixel matrix, and for each said block, equally dividing the sum of the mean value Q1 for image data of a value below a first parameter P1 among the image data of each pixel and the mean value Q4 for image data of pixels above a second parameter P2 which is greater than said first parameter, and gradient range exponent expressing the difference between said mean value Q1 and said mean value Q4;

memory unit for storing mean value information, gradient range exponent, and code data of each block obtained by the encoding process in the encoding unit;

decoding process unit for decoding code data in block units based on the mean value information and gradient range exponent stored in said memory unit; and reverse optimization process unit for returning the distribution state of data of the luminance component and chromaticity component decoded in the decoding process unit to a state prior to conversion in said optimization process unit.

To attain the aforesaid object it is desirable to provide a setting means for setting the data range of the luminance component and chromaticity component recognized as skin tone, such that the aforesaid optimization process unit compares the luminance component and chromaticity component data within a range set by said setting means to luminance component and chromaticity component data outside said range, and accomplishes conversion to achieve distribution in a wider range. Alternatively, a setting means may be provided for setting the data range of the luminance component and chromaticity component recognized as skin tone, such that the aforesaid optimization process unit converts the distribution state of said luminance component and chromaticity component data so as to achieve a distribution from a minimum value to a maximum value derived from said data in a color space based on a minimum value and maximum value of said luminance component and chromaticity component set by said setting means when the values of both the luminance component and chromaticity component data are within a range set by said setting means, and the state of said data distribution is converted so as to achieve a distribution from a minimum value to a maximum value of said data within a color space based on the minimum value and maximum value of the respective luminance component and chromaticity component obtained by the data conversion unit when at least one among the luminance component data or chromaticity component data is outside a range set by said setting means.

The object of the present invention is further attained by providing:

a data conversion unit for converting RGB image data of a document to luminance component and chromaticity component;

optimization process unit for converting the distribution state of said chromaticity component data of a particular pixel within a predetermined range so as to achieve a distribution from a minimum value of a maximum value of chromaticity component data within a color space based on a minimum value and maximum value of chromaticity component data of a particular pixel having luminance component data obtained by said data conversion unit within a predetermined range;

encoding process unit for encoding data of each pixel within a block as code data obtained by quantization at a gradient level less than said data within a range of gradient distribution in said block based on mean value information determined by dividing data of the luminance component and chromaticity component converted by the optimization process unit into blocks comprising a predetermined pixel matrix, and for each said block, equally dividing the sum of the mean value Q1 for image data of a value below a first parameter P1 among the image data of each pixel and the mean value Q4 for image data of pixels above a second parameter P2 which is greater than said first parameter, and gradient range exponent expressing the difference between said mean value Q1 and said mean value Q4;

memory unit for storing mean value information, gradient range exponent, and code data of each block obtained by the encoding process in the encoding unit;

decoding process unit for decoding code data in block units based on the mean value information and gradient range exponent stored in said memory unit; and reverse optimization process unit for returning the distribution state of data of the luminance component decoded in the decoding process unit to a state prior to conversion in said optimization process unit based on luminance component data.

These and other objects, advantages, and features of the invention will becomes apparent from the following description thereof taken in conjunction with the accompanying drawings which illustrate specific embodiments of the invention

BRIEF DESCRIPTION OF THE DRAWINGS

In the following description, like parts are designated by like reference numbers throughout the several drawings.

FIG. 11 shows the construction of the color space optimization process unit 603 and color space reverse optimization process unit 605;

FIGS. 16a through 16d are illustrations showing the current range of data of color components a* and b* present in the a*b* plane at luminance L* of various predetermined ranges;

FIGS. 20a and 20b are graphs used in the color space optimization process (2);

FIGS. 25a through 25f are graphs used in color space optimization process (4);

DETAILED DESCRIPTION OF THE PREFERRED EMBODIMENTS

Figure 1:
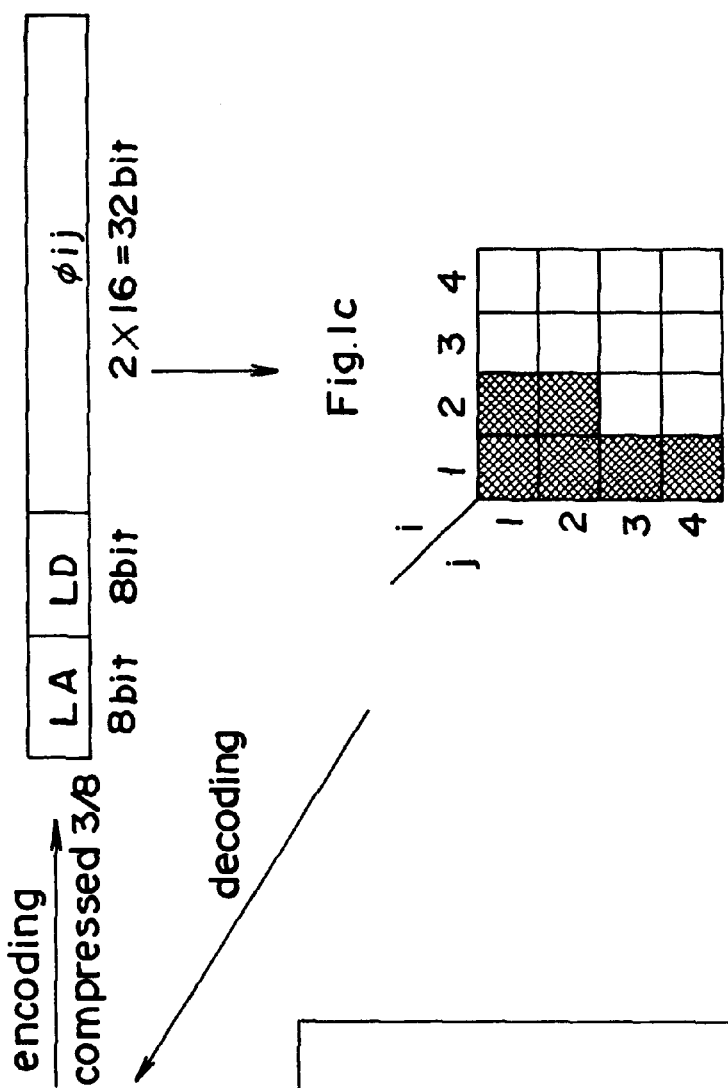
FIGS. 1a through 1c illustrate the general flow of a GBTC type encoding process.

The preferred embodiments of the present invention are described hereinafter with reference to the accompanying drawings.

The digital color copier of the present embodiment executes an optimization process to correct polarization of the image data distribution state prior to executing the GBTC encoding process. Furthermore, a reverse optimization process is executed after a decoding process to restore the original distribution state. Thus, loss of image data reproducibility due to division in the encoding and decoding processes can be prevented.

(1) Encoding of image data by GBTC method
(2) Digital color copying apparatus
   (2-1) Construction
   (2-2) Operation panel
   (2-3) Process block
(3) Description of image process
   (3-1) Main routine
   (3-2) Mode setting process
   (3-3) Color space optimization process
      (3-3-1) Color space optimization process unit and reverse conversion process unit
      (3-3-2) Color space optimization process
         (3-3-2-1) Color space optimization process (1)
         (3-3-2-2) Color space optimization process (2)
         (3-3-2-3) Color space optimization process (3)

(3-3-2-4) Color space optimization process (4)
(3-3-3) Color space reverse optimization process
   (3-3-3-1) Color space reverse optimization process (1)
   (3-3-3-2) Color space reverse optimization process (2)
   (3-3-3-3) Color space reverse optimization process (3)
   (3-3-3-4) Color space reverse optimization process (4)

(1) Image Data Encoding by GBTC Method

In the GBTC method, document image data are extracted for each block of a predetermined pixel matrix, and the data of each pixel within a block are compression coded as code data quantized to a gradient level smaller than said data within a range of gradient distribution within said block based on mean value information LA determined by dividing the sum of a mean value Q1 of data values below a parameter P1 determined from data within the block and a mean value Q4 of data values above a parameter P2 (where P1<P2 relationship is satisfied), and a gradient range exponent LD expressing the difference in the mean value Q1 and said mean value Q4.

FIGS. 1a through 1c illustrate the flow of the GBTC type encoding process executed by the digital color copier of the present embodiment. In the GBTC method, image data of a document image are extracted in 4×4 pixel block units. The image data within the extracted 4×4 pixel block are subjected to an encoding process by a method described using FIGS. 2a through 2c below, and image data (16 bytes, i.e., 128 bits) of 1 byte (=8 bits) data per pixel by 16 pixels are encoded as data of a total of 6 bytes (=48 bits) of 2 bytes code data by 16 pixels allocated by dividing the data of each pixel, i.e., 1 byte gradient range exponent LD, 1 bytes mean value information LA, in four levels. Thus, the data quantity is compressed $3/8$. FIG. 1c shows the data quantity of the encoded image data equivalent to 6 pixels of image data prior to encoding. Decoding of the encoded data is accomplished by calculating 1 byte image data corresponding to each 2 bits of code data based on the gradient range exponent LD and mean value information LA. Although document image data are extracted in block units of 4×4 pixels in the present embodiment, the present invention is not limited to this arrangement, however, inasmuch as block units of 3×3 pixels, or 6×6 pixels may be extracted. Furthermore, the present invention is not limited to encoding the 256 halftone data of each pixel within a block as 4-level code data, inasmuch as said 256 halftone data may be encoded to 2-level, or 8-level code data.

Figure 2:
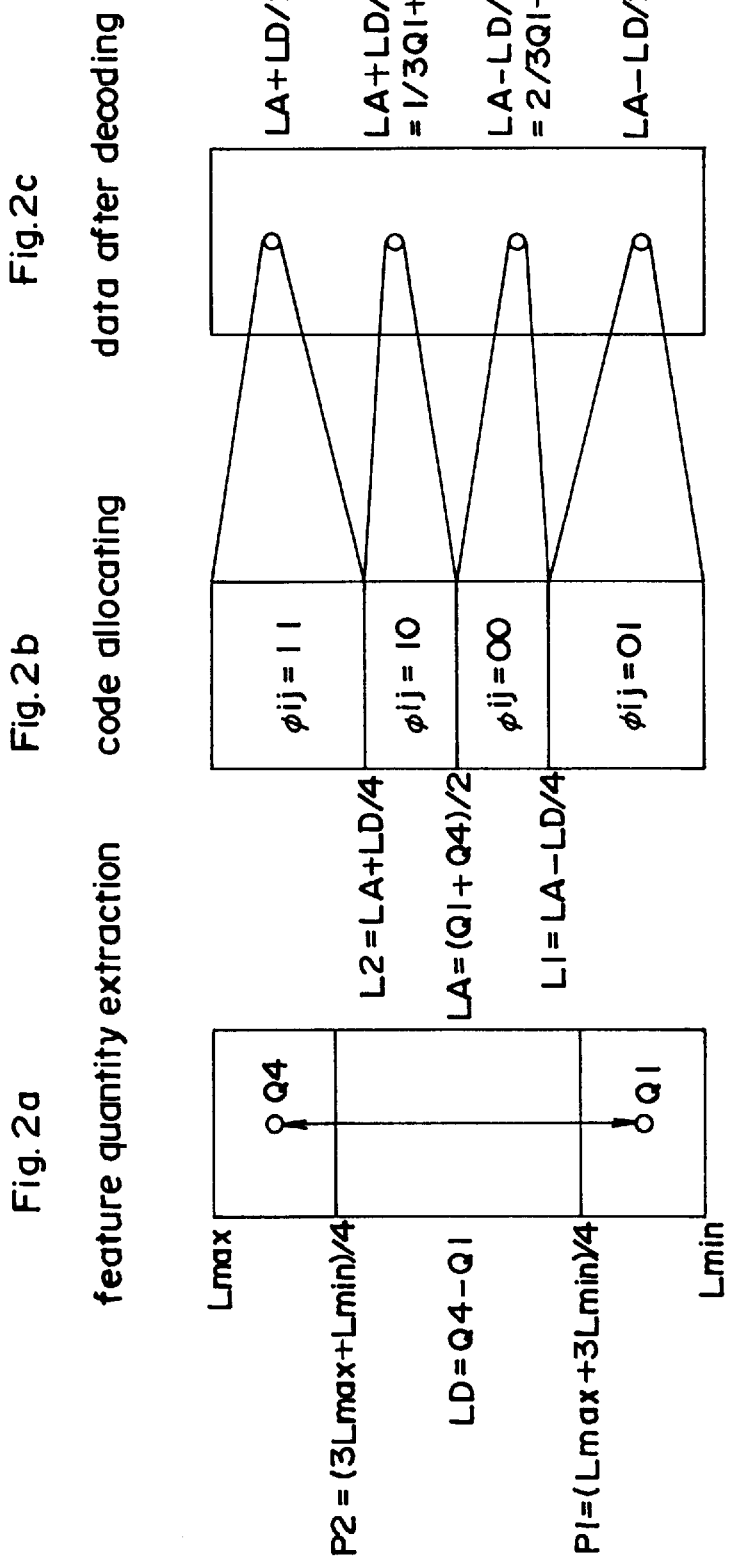
FIGS. 2a through 2c show the GBTC encoding process.

FIGS. 2a through 2c show the GBTC type encoding process and decoding process. FIG. 2a shows the relationship among maximum value Lmax, minimum value Lmin, parameters P1 and P2, and gradient range exponent LD. A predetermined feature quantity required for encoding is determined from image data extracted in block units of 4×4 pixels. The feature quantity is determined by the following calculations. First, the maximum value Lmax and minimum value Lmin of each 8-bit image data within a 4×4 pixel block are detected. Then, parameter P1 is determined by adding ¼ of the difference between maximum value Lmax and minimum value Lmin to said minimum value Lmin, then parameter P2 is determined by adding ¾ of said difference to minimum value Lmin. That is, parameters P1 and P2 are determined via the calculations of Equation 1 and Equation 2 above.

Then, the mean value Q1 is determined for image data of pixels below parameter P1 among the image data of each pixel. Thereafter, the mean value Q4 is determined for image data of pixels above parameter P2 among the image data of each pixel. The mean value information LA=(Q1+Q4)/2 and gradient range exponent LD=Q4−Q1 are determined.

Thereafter, the standard values L1 and L2 are determined via the calculations of the aforesaid Equations 3 and 4. Standard values L1 and L2 are used together the aforesaid mean value information LA when encoding the 1-byte (8-bit)data of each pixel, i.e., the 256 gradient image data, to 2-bit, 4 gradient code data.

FIG. 2b shows the value of code data Φij allocated in accordance with the data value of pixel Xij of line i (where i=1, 2, 3, 4; hereinafter the same) and row j (where j=1, 2, 3, 4; hereinafter the same) within the 4×4 pixel block. More specifically, the 2-bit code data Φij of the values shown in Table 1 below are allocated in accordance with the value of pixel Xij.

Data encoded by the GBTC method comprise code data (16×2 bits) of a 16-pixel block, and the gradient range exponent LD and mean value information LA of each 1 byte (8-bits).

FIG. 2c shows data after decoding of the code data Φij allocated within the block. The gradient range exponent LD and mean value information LA are used when decoding the encoded data. That is, the data of pixel Xij are substituted by 256 gradient data of the value shown in Table 2 in accordance with the value code data Φij allocated to pixel Xij of line i and row j.

The image data of pixel Xij (where i and j are respectively values among 1, 2, 3, 4) within the 4×4 pixel block are substituted by four types of values of 256-gradient data via the GBTC type encoding process and decoding process. The decoded data include obvious errors in comparison to the original document image data. These errors are difficult to discern, however, due to limitations of human visual acuity, i.e., there is virtually no discernible loss of image quality in normal images. Parameters Q1 and Q4 can be determined from the gradient range exponent LD and mean value information LA contained in the coded data. Therefore, in a text image, if a black color portion is below parameter P1 and a white color portion is above parameter P2, said text image can be completely restored.

(2) Digital Color Copying Apparatus (2-1) Construction

Figure 3:
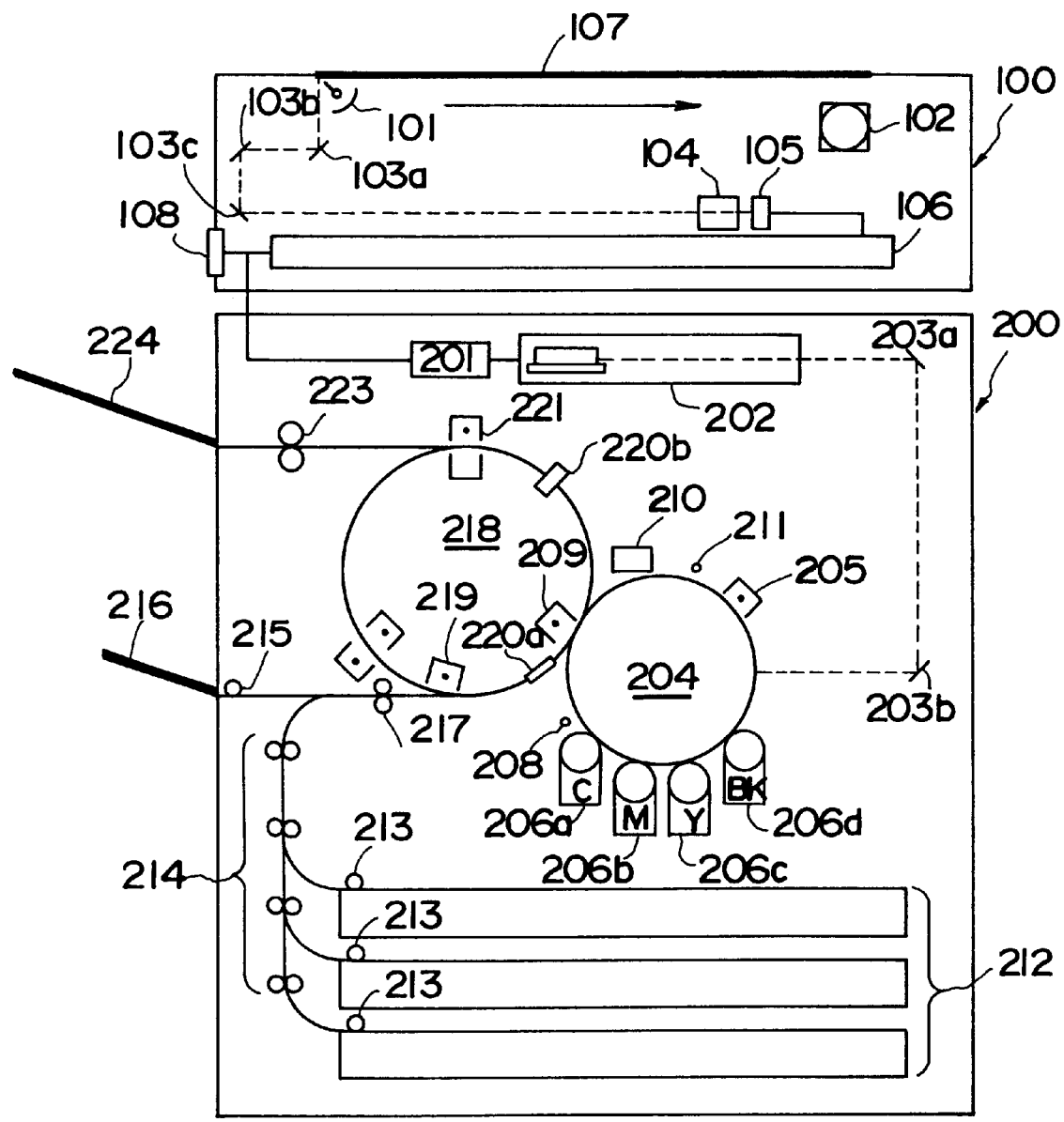
FIG. 3 is a section view of an embodiment of a digital color copier.

FIG. 3 is a section view of the digital color copier of the present embodiment. This digital color copier can be broadly divided into an image reading unit 100 for reading RGB image data of a document, and a copying unit 200.

In image reading unit 100, a document placed on glass document platen 107 is irradiated by an exposure lamp 101. The light reflected from the document is directed to a lens 104 by three mirrors 103a, 103b, and 103c, and forms an image on charge-coupled device (CCD) sensor 105. The exposure lamp 101 and mirror 103a move in accordance with the set magnification at a speed V in the arrow direction (subscan direction) via a scanner motor 102. Thus, the document placed on the document platen is scanned across its entire surface. The mirrors 103b and 103c move in the arrow direction (subscan direction) at a speed V/2 in conjunction with the movement of exposure lamp 101 and mirror 103a in the same arrow direction. The multi-level electronic signals of the three RGB colors obtained by CCD sensor 105 are converted to 8-bit halftone data of yellow (Y), magenta (M), cyan (C), or black (BK) by read signal processing unit 106, and thereafter, the converted image data are output to copy unit 200 via external output port 108.

In copy unit 200, image data correction unit 201 accomplishes halftone correction (gamma correction) of the input halftone data in accordance with the tone characteristics of the photosensitive member. Printer exposure unit 202 accomplishes digital-to-analog (D/A) conversion of the corrected image data, generates laser diode drive signals, and drives a semiconductor laser via said drive signals.

The laser beam emitted from printer exposure unit 202 in accordance with the image data irradiates the rotatably driven photosensitive drum 204 via reflecting mirrors 203a and 203b. Photosensitive drum 204 is irradiated by eraser lamp 211 before image exposure of each single copy, and is uniformly charged by charger 205. When the drum 204 is optically exposed in this state, an electrostatic latent image of the document is formed on the surface of photosensitive drum 204. Only one among the cyan (C), magenta (M), yellow (Y), and black (BK) toner developing devices 206a through 206d is selected, and develops the electrostatic latent image formed on the surface of photosensitive drum 204. After surplus charge is eliminated by eraser 208 prior to transfer, the developed toner image is transferred to a copy sheet wrapped around the transfer drum 218.

Transfer drum 218 has a transfer film on its surface, and rotates in a counterclockwise direction at the same speed as the rotation speed of the photosensitive member. A reference panel 220a is provided on the interior side of transfer drum 218 to synchronize the copy sheet home position and the image transfer position. Reference position sensor 220b generates a predetermined reference signal whenever reference panel 220a intersects said sensor 220a in accordance with the rotation of transfer drum 218. The copy sheet is fed from paper cassette units 212 to the transport path via take-up roller 213, and transported to timing roller 217 via feed roller 214. When a copy sheet is inserted in manual tray 216, it is fed to timing roller 217 via feed roller 215. Timing roller 217 supplies a copy sheet to transfer drum 218 synchronously with the aforesaid reference signal, and holds the copy sheet at a predetermined position on transfer drum 218. The copy sheet supplied to transfer drum 218 from timing roller 217 is electrostatically adhered to transfer drum 218 by charger 219.

The aforesaid printing process is repeated for the four colors yellow (Y), magenta (M), cyan (C), and black (BK). At this time, photosensitive drum 204, exposure lamp 101 in synchronization with the operation of transfer drum 218, and mirrors 103a, 103b, and 103c repeat predetermined operations.

Thereafter, the copy sheet is separated from transfer drum 218 by eliminating the charge electrostatically holding the copy sheet via a release charger pair 221. The copy sheet released from transfer drum 218 is subjected to a fixing process by a pair of fixing rollers 223, and is subsequently ejected to discharge tray 224.

(2-2) Operation Panel

Figure 4:
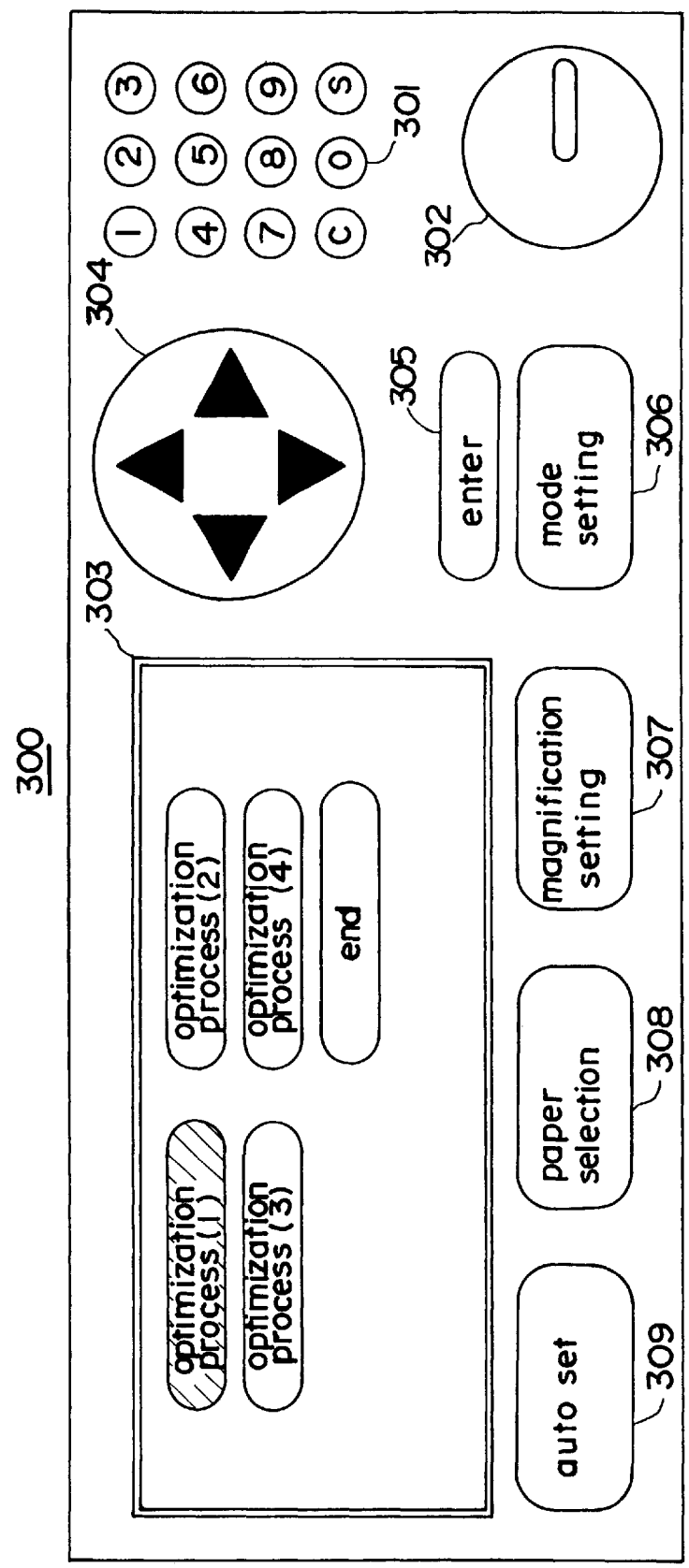
FIG. 4 is an elevation view of operation panel 300.

FIG. 4 is an elevation view of operation panel 300 of copying apparatus 1. Ten-keypad 301 is used when setting the number of copies and the skin tone area used by the optimization process. Print key 302 is used of start the copy operation. Display LCD 303 displays the copy state and mode setting screen. When mode setting key 306 is pressed, a screen (current display screen) is displayed on display LCD 303 for selecting the type of optimization process to be executed by optimization process unit 603. The cursor key 304 is used when selecting among a plurality of items displayed on display LCD 303. An item selected by cursor key 304 is displayed in reverse video highlight. In the drawing, color space optimization process (1) is selected.

Setting of an item selected by cursor key 304 is accomplished by pressing the enter key 305. An item set by enter key 305 remains displayed in reverse video highlight. Although the specifics of the process contents are described later, in the copying apparatus of the present embodiment, one of four types of processes, i.e., color space optimization processes (1) through (4), may be set. The default setting is color space optimization process (1). When color space optimization processes (3) and (4) are selected, display LCD 303 displays screen required for setting various values including the maximum value as*max and minimum value as*min of chromaticity component a*, and maximum value bs*max and minimum value bs*min of chromaticity component b*. The values of the set luminance component Ls*max and Ls*min, and chromaticity components as*max and as*min, and bs*max and bs*min are stored in hard disk 614. Operation panel 300 is also provided with magnification setting key 307 for setting the copy magnification, paper selection key 308 for selecting the copy paper size, and auto set key 309 for setting the automatic paper selection function.

(2-3) Process Block

Figure 5:
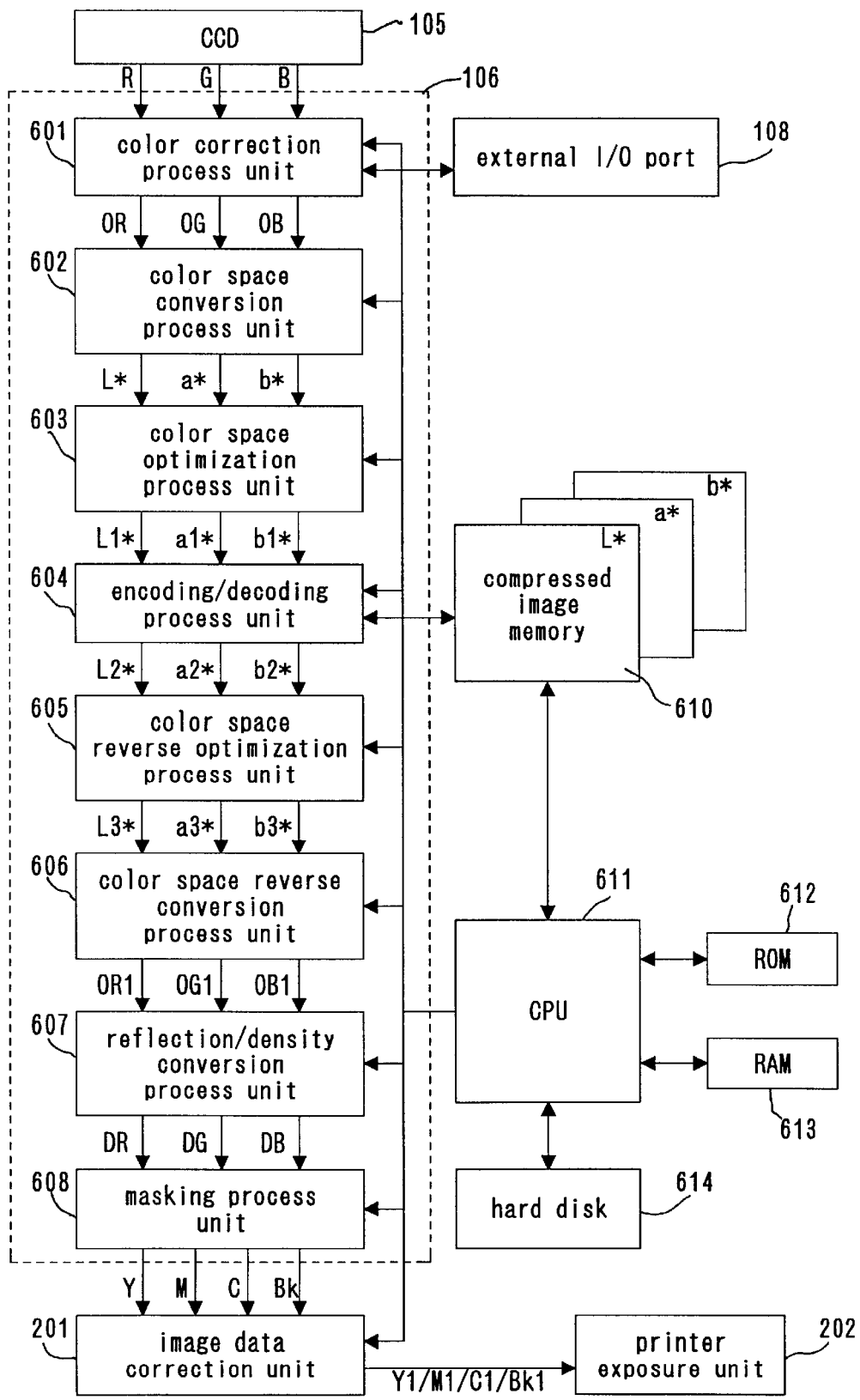
FIG. 5 is a block diagram of the various signal processes executed by read signal process unit 106.

FIG. 5 is a block diagram of the various signal processes executed by the aforesaid read signal process unit 106. The various R, G, B image data of a document read by CCD sensor 15 has some variance due to individual differences of CCD sensors 105 provided in various copying apparatuses. Thus, even when reading identical color table reference patterns, there are differences in the values of read data of each copying apparatus. In reading device color correction processing unit 601, the read RGB image data are corrected to standard RGB image data which are standardized by the National Television system Committee (NTSC) Standards, High Definition Television Standards (HDTV) or the like. In reading device color correction processing unit 601, the corrected image data OR, OG, OB are output to the next color space conversion process unit 602 as well as output to I/O port 108. The peripheral devices connected to the copying apparatus receive the OR, OG, OB image data of the document via external I/O port 108.

Furthermore, the copying apparatus of the present embodiment is capable of forming images using said OR, OG, OB image data input from a peripheral device via external I/O port 108, and in such circumstances the copying apparatus functions as a printer. This function is possible because the various processes of reading device color correction processing unit 601, are set to use standardized RGB image data.

Figure 6:
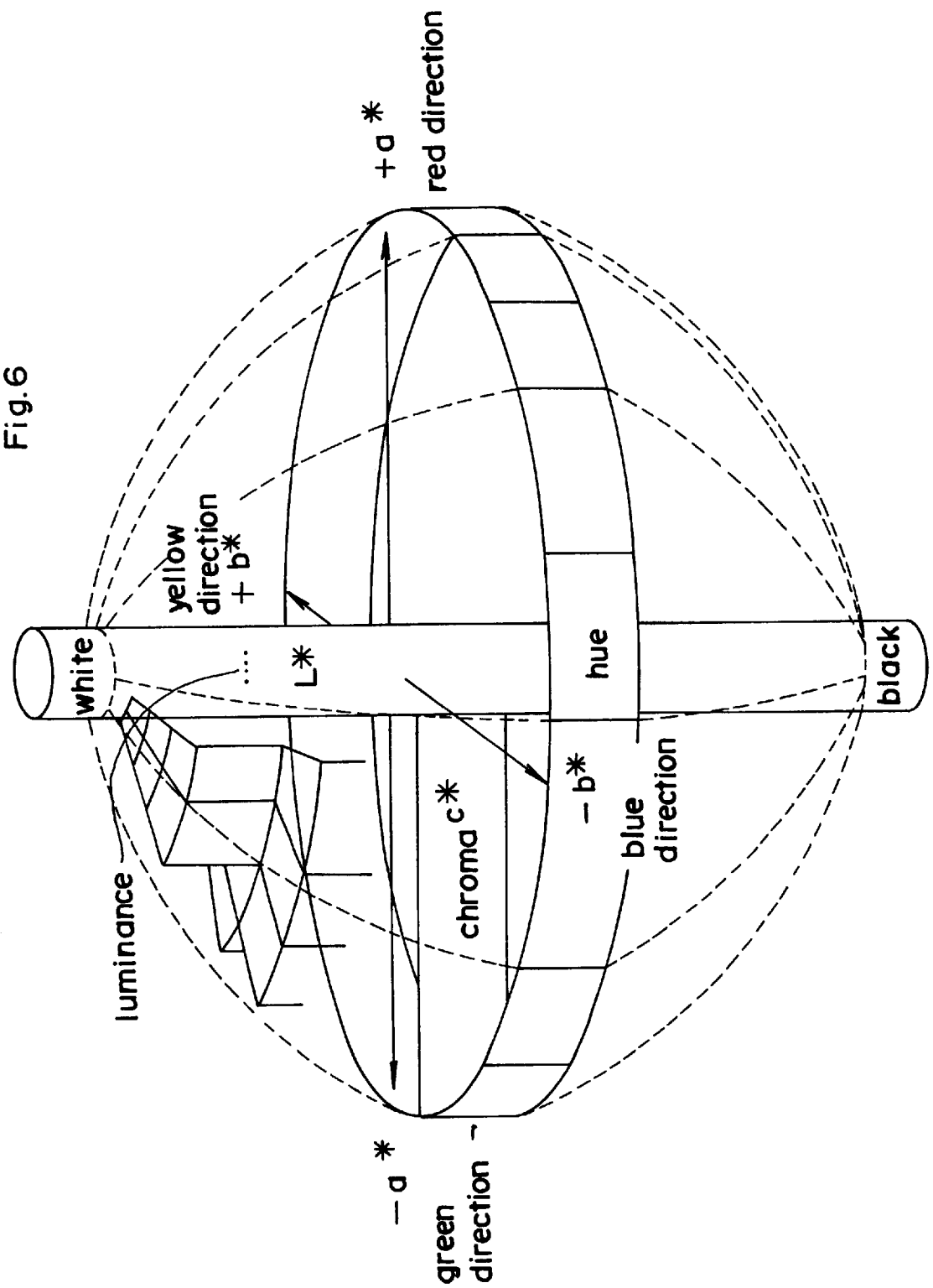
FIG. 6 shows L*a*b* colorimetric system stereo.

Color space conversion process unit 602 converts the standardized RGB image data (OR, OG, OB) to an XYZ colorimetric system, and thereafter converts said data to L*a*b* calorimetric system data. FIG. 6 shows an L*a*b* calorimetric system stereo. Luminance 0 (black) through 255 (white) is expressed in units L*, and hue and chroma are expressed unit a*, and b*, respectively. Chromaticity components a* and b* respectively express color direction; chromaticity component a* expresses the red-to-green direction, and chromaticity component b* expresses the yellow-to-blue direction.

Conversion of RGB image data to L*a*b* is accomplished for the following reasons. As previously described, in the GBTC method, the 8-bit image data Xij within each 4×4 pixel block are converted to 2-bit code data Φij. During decoding, the four types of values of the 256-halftone data specified based on gradient range exponent LD and mean value information LA are substituted in accordance with the code data Φij allocated in each pixel. Thus, the image data obtained by decoding have some degree of error relative to the image data before encoding. When the color of pixels are reproduced using the RGB image data containing these errors, there is color shifting in the edge portions of the document. If L*a*b* calorimetric system data are used, however, luminance and chromaticity vary only slightly and color shift does not occur in the edge portions of the document even when errors do occur in the values of the decoded data. Thus, RGB image data are converted to L*a*b* calorimetric system data in the copying apparatus of the present embodiment when document image data are encoded and decoded. The use of L*a*b* calorimetric system data in the copying apparatus of the present embodiment may include, insofar as RGB image data are converted to hue, luminance, and chroma data, conversion to other calorimetric system data such as L*u*v* calorimetric system data, YCrCb data, HVC data and the like.

Figure 7A:
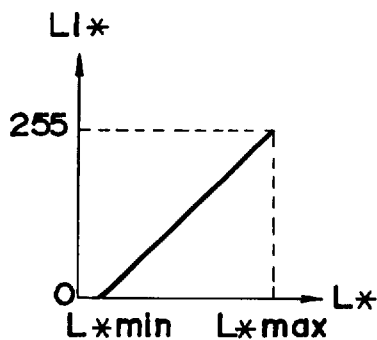
FIGS. 7a through 7c are graphs used in the color space optimization process.
Figure 7B:
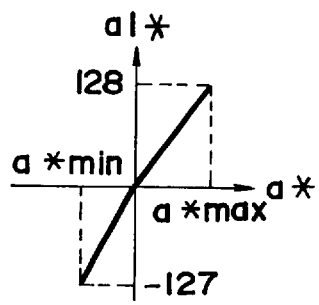
Figure 7C:
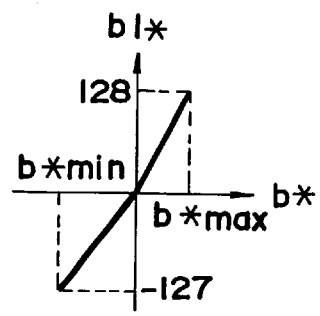

Color space optimization process unit 603 executes a calculation process based, for example, on the graphs of FIGS. 7a through 7c, relative to the respective data of document image information L*, a*, and b* expressed in the L*a*b* colorimetric system, and changes the distribution of luminance component L* from L*min through Lmax to 0–255, and changes the distributions of chromaticity components a* and b* from a*min through a*max and b*min through b*max to -127 through 128, respectively. The graphs shown in FIGS. 7a through 7c are used in color space optimization process (1). In the copying apparatus of the present embodiment, one process is set from among the four selectable types of color space optimization processes (1) through (4). When an optimization process is not selected by a user, the default color space optimization process (1) is executed. The color space optimization processes (1) through (4) are described later. The color space optimization processes are used for the following reasons. In the GBTC type encoding and decoding processes, a multiplicity of divisions are executed as shown in the previously described equations (1) though (4). Therefore, when there are slight differences among component data of each pixel, there is a reduction in the reproducibility of image data obtained by decoding when said differences are lost during calculations. In color space optimization process unit 603, the luminance component L* distribution is changed to a distribution in the complete range 0-to-255 for each document by means of the aforesaid calculations, and the respective distributions of chromaticity components a* and b* are changed to distributions in the complete range of -127 to 128 of reach document. Thus, mitigating the adverse affects of the aforesaid divisions.

In encoding/decoding process unit 604, the image data obtained by the color space optimization process is subjected to a GBTC type encoding process. The encoded data (gradient range exponent LD, mean value information LA, code data $\Phi ij$) are stored in compressed image memory 610. When the code data are decoded, the code data stored in compressed image memory 610 are readout for each block, and said read data are subjected to a decoding process. The decoded image data luminance component L2* and chromaticity components a2* and b2* are output by encoding/decoding process unit 604.

Figure 8A:
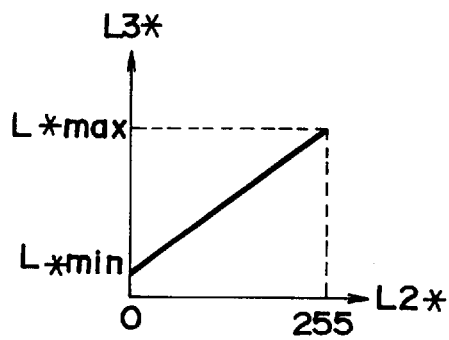
FIGS. 8a through 8c are graphs used in the color space reverse optimization process.
Figure 8B:
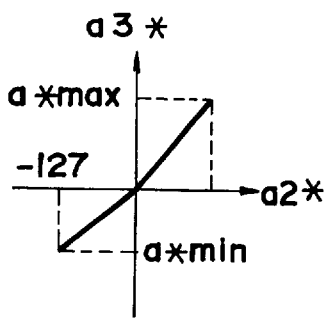
Figure 8C:
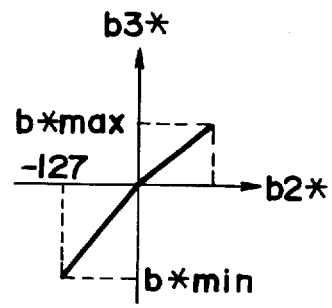

In color space reverse optimization process unit 605, a color space reverse optimization process is executed relative to the color space optimization process executed by color space optimization process unit 603, and each data distribution is restored to its original form. Color space reverse conversion process (1) is executed based on the graphs shown in FIGS. 8a through 8c. The color space reverse optimization processes (1) through (4) are described later.

The color space reverse conversion process unit 606, the various decoded L3*, a3*, and b3* data are reverse converted to OR1, OG1, and OB1 RGB image data. The reflection/density conversion process unit 607 subjects the OR1, OG1, and OB1 RGB image data to predetermined reflection/density conversion processing, and thereafter outputs DR, DG, and DB density data. After the RGB image data converted to density data are converted to one color image data among the cyan (C), magenta (M), yellow (Y), and black (BK) 9n masking process unit 608, said data are output to image data correction unit 201. In image data correction unit 201, the gradient data output from masking process unit 608 are subjected to predetermined gradient correction (gamma correction), and thereafter said gradient data are output to printer exposure unit 202.

(3) Image Processing
(3-1) Main Routine

Figure 9:
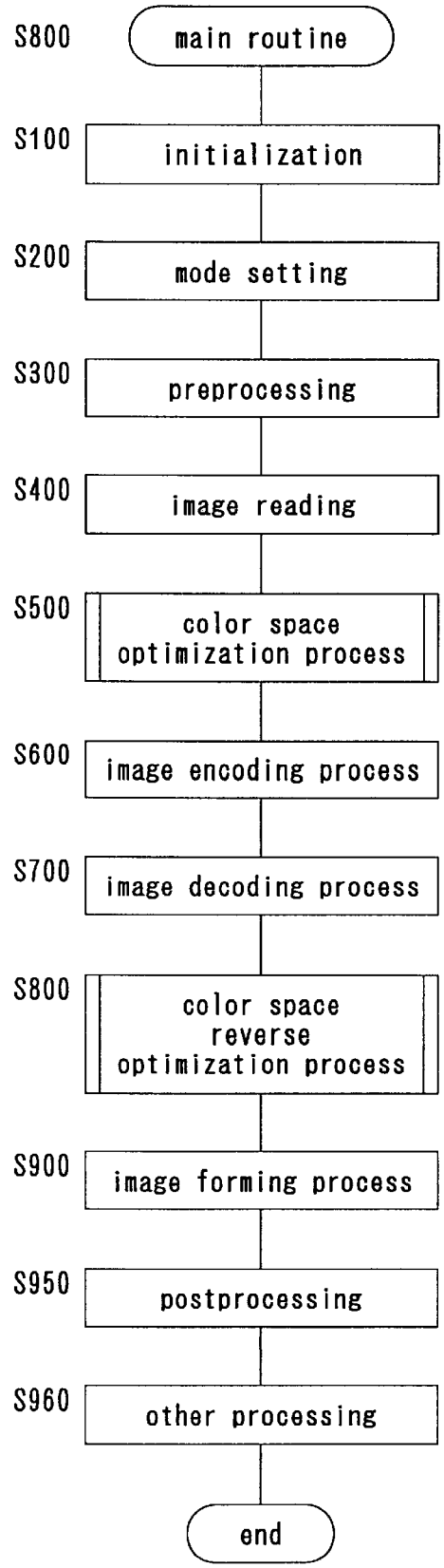
FIG. 9 shows the main routine of the copy process executed by CPU 611 of the copier.

FIG. 9 shows the main routine of the copying process executed by CPU 611 of the copying apparatus of the present embodiment. First, initialization is executed for the main unit of the copying apparatus (step S100). Then, the mode setting process is executed from operation panel 300 (step S200). This process selects and sets one process among the four types of color space optimization processes (1) through (4). When no optimization process selection is made, the default color space optimization process (1) is set. Then, preprocessing is executed, e.g., apparatus warm up, shading, image stabilization and the like (step S300). Thereafter, CPU 611 actuates scanning motor 102, reads image data of a document placed on document platen 107, standardizes the read RGB image data, and subsequently converts the standardized RGB image data to L*a*b* calorimetric system data (step S400). Next, the single color space optimization process (1) though (4) selected by a user in the aforesaid mode setting process (step S200) is executed (step S500). After document image data expressed as L*a*b* colorimetric system data obtain by the color space optimization process are encoded using the GBTC method, said data are stored in compressed image memory 610 (step S600). Then, the data stored in compressed image memory 610 are read out in block units, and subjected to a GBTC type decoding process, to obtain 256-gradient data the luminance component L8, and chromaticity components a* and b* of the code data (step S700). The decoded data are then subjected to color space reverse optimization processing relative to the color space optimization process executed in the previous step S500 (step S800). When, for example, color space optimization process (1) has been executed, the color space reverse optimization process (1) is executed. In step S900, an image forming process is executed to form an image on a copy sheet based on the RGB image data obtained by the color space reverse optimization process. After image formation, other processes not directly related to the image forming operation are executed, e.g., removal of residual toner from the surface of photosensitive drum 204 after image formation and the like, to maintain the condition of the apparatus (step S950). Finally, fixing device temperature control, communication control and other processes are executed which do not directly bear on the image forming process of the present embodiment (step S960).

(3-2) Mode Setting Process

Figure 10:
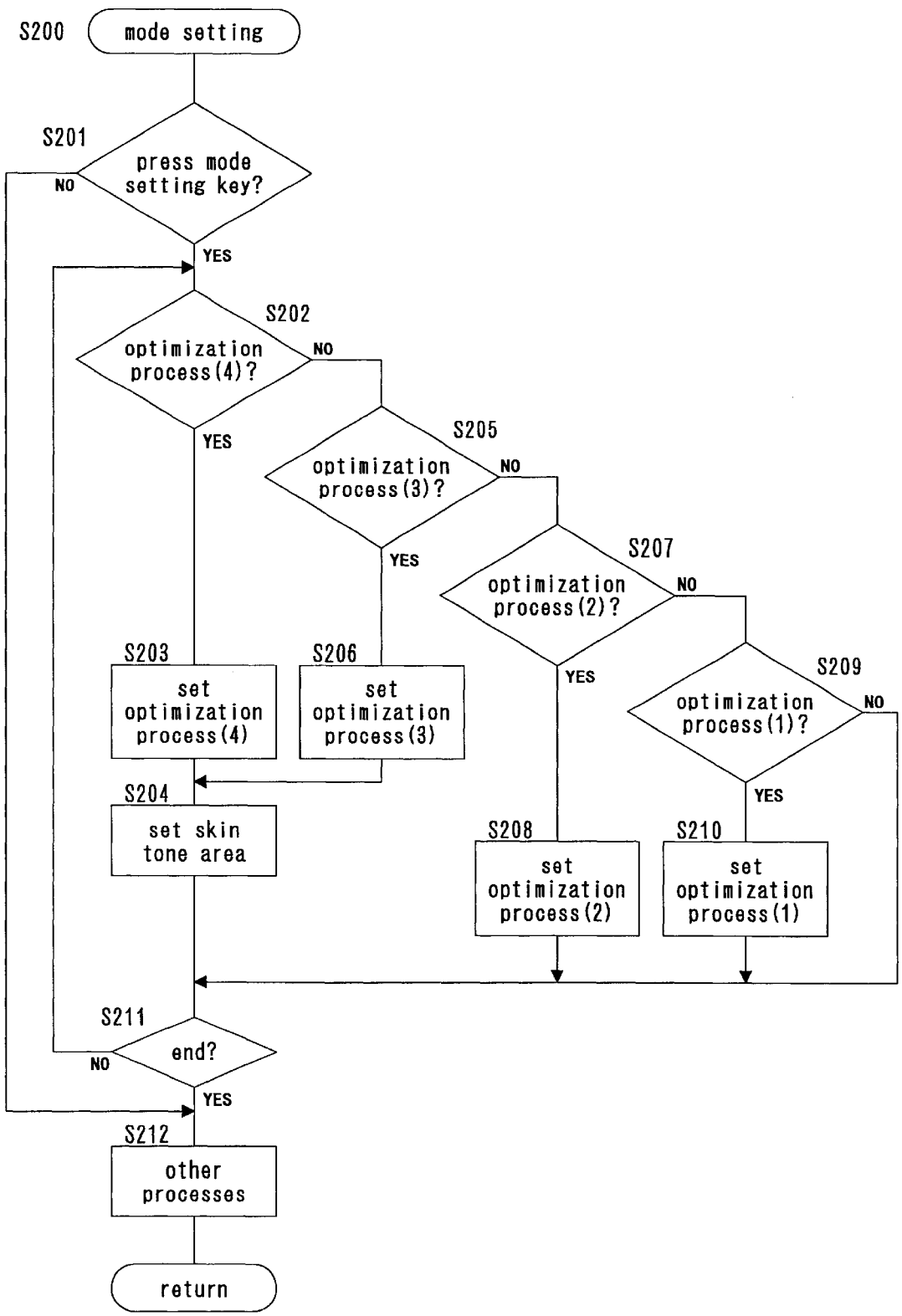

FIG. 10 is a flow chart of the mode setting process (step S200 in FIG. 9). When a user presses mode setting key 306 (step S201: YES), the mode setting screen of FIG. 4 is displayed on display LCD 303. Then, when the user sets the optimization process (4) (step S202: YES), color space optimization process (4) and color space reverse optimization process (4) are both set, and screen required for setting the skin tone area information used by the color space optimization process (4) and color space reverse optimization process (4), i.e., the screen required for setting the various values of maximum value Ls*max and minimum value Ls*min of luminance component L*, maximum value as* and minimum value as* of chromaticity component as*, and maximum value bs*max and minimum value bs*min of chromaticity component bs* which determine the skin tone area, are displayed on display LCD 303 (step S203). According to the Journal of the Color Science Association of Japan (Vol. 14, No. 3 p.154), Caucasian skin tone has luminance component L*=66.13, chromaticity component a*=12.43, and chromaticity component b*=15.26, whereas Japanese skin tone has luminance component L*=64.82, chromaticity component a*=12.70, and chromaticity component b*=15.77 for example, a user may set Ls*max and Ls*min at 68 and 62, as*max and as*min at 15 and 10, and bs*max and bs*min at 18 and 13, respectively. The method of setting may be direct numerical input via ten-key pad 301, or some representative numbers may be displayed on display LCD 303 for selection. Each value set by a user is stored on hard disk 614 as skin tone area information (step S204). When color space optimization process (3) is selected by a user (S205: YES), color space optimization process (3) and color space reverse optimization process (3) are both set, and the screen required for skin tone area information input is displayed on display LCD 303 just as when color space optimization process (4) was selected (step S206). The various values relating to skin tone area set by a user are stored on hard disk 614 (step S204). During the execution of color space optimization processes (3) and (4) and the execution of color space reverse optimization processes (3) and (4) described later, the aforesaid values are read from hard disk 614, and output as skin tone area information to skin tone area discrimination unit 621, and L2* calculation unit 633, a2* calculation unit 634, and b2* calculation unit 635. When a user selects the optimization process (2) (step S207: YES) , the color space optimization process (2) and color space reverse optimization process (2) are set (step S208). When a user selects the optimization process (1) (step S209: YES), the color space optimization process (1) and color space reverse optimization process (1) are set (step S210). When a user selects END item (step S211: YES), other processes are executed and thereafter the routine returns. When the user does not press the mode setting key 306 (step S201: NO), and when neither optimization processes (1) though (4) are set regardless of whether or not the mode setting key 306 has been pressed, the default color space optimization process (1) and color space reverse optimization process (1) are set.

(3-3) Color Space Optimization Process

In the copying apparatus of the present embodiment, four types of color space optimization processes are executed in accordance with the mode set by a user.

The color space optimization process (1) is executed by default. This process detects color reproduction range of luminance component L*, chromaticity components a* and b* (i.e., maximum value L*max and minimum value L*min of luminance component L*, maximum value a*max and minimum value a*min of chromaticity component a*, and maximum value b*max and minimum value b*min of chromaticity component b*) and, based on the graphs of FIGS. 7a through 7c, the distribution of luminance component L* is converted to a distribution from a minimum value to a maximum value of said data within the color space, and the distributions of chromaticity components a* and b* are changed to distribution from a minimum value of a maximum value of data in said color space. In the present embodiment, the distribution of luminance component L* is converted to a distribution from 0 to 255, and the distributions of the chromaticity components a* and b* are changed to distributions from −127 to 128.

The color space optimization process (2) focuses on changing the distribution range of chromaticity components a* and b* via the value of luminance component L8, as can be readily understood from the L*a*b* calorimetric system stereo shown in FIG. 6, by delimiting each value of luminance L* into a predetermined range so as to change the distributions of chromaticity components a* and b* of pixels within said ranges to distributions from a minimum value of a maximum value of data within the color space. In the present embodiment, the distributions of chromaticity components a* and b* of pixels within each range are changed to distributions from −127 to 128.

Figure 23A:
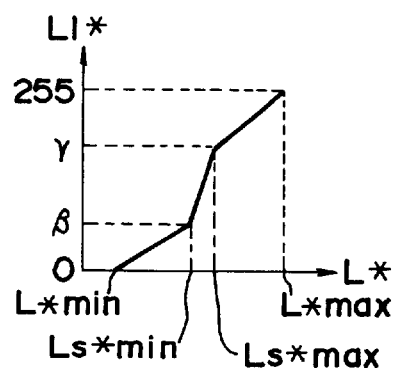
FIGS. 23a through 23c are graphs used in the color space optimization process (3)

The color space optimization process (3) particularly increases the number of bits allocated to data values of luminance component L* and chromaticity components a* and b* (Ls*min≦L*≦Ls*max, as*min≦as*≦as*max, bs*min≦bs*≦bs*max) within a skin tone area range set by a user. For example, the luminance component L8 outside the aforesaid range is distributed in a wider range than the luminance component L* within the range of Ls*min to Ls*max, as shown in FIG. 23a. Thus, color reproducibility of the skin tone area is improved.

The color space optimization process (4) is a separate optimization process for pixels of other areas when the values of luminance component L*, and chromaticity components a* and b* of a particular pixel are within a skin tone area range set by a user. For example, color space optimization process is executed for luminance component L* of a pixel related to skin tone area based on the graph of FIG. 25d. On the other hand, color space optimization process is executed for luminance component L* if pixels unrelated to the skin tone area based on the graph in FIG. 25a. Thus, color reproducibility of skin tone areas is improved.

Figure 11:
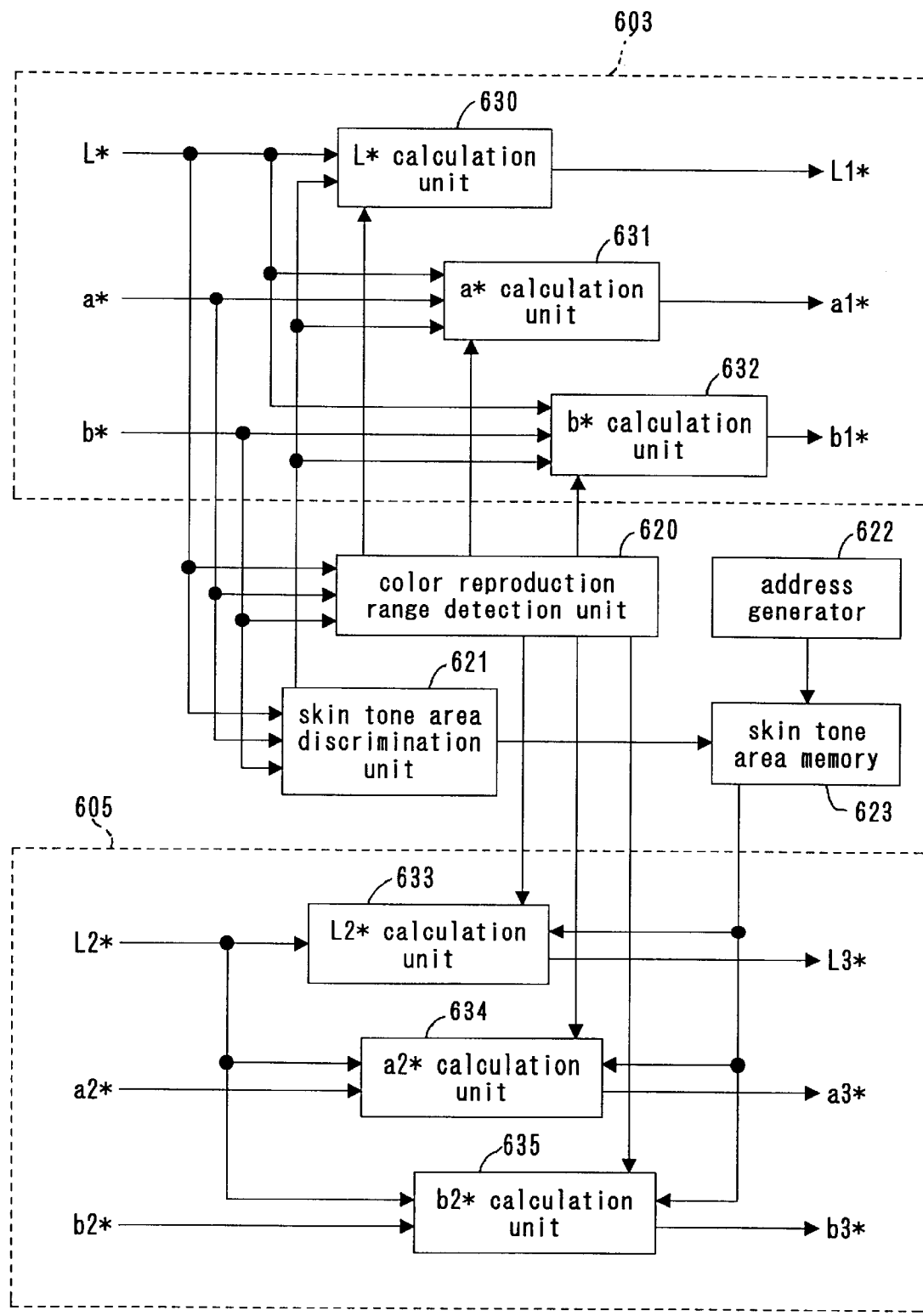
FIG. 11 is a flow chart of the mode setting process (step S200)

(3-3-1) Construction of Color Optimization Process Unit ad Color Reverse Conversion Process Unit FIG. 11 shows the construction of color space optimization process unit 603 and color space reverse optimization process unit 605. The various data of L*, a* and b* received from color space conversion process unit 602 are respectively input to L* calculation unit 630, a* calculation unit 631, and b* calculation unit 632, to establish one process among the color space optimization processes (1) through (4). Color reproduction range detection unit 620 detects and stores the distribution range of L8, a*, b* data (i.e., maximum value L*max and minimum value L*min of luminance component L*, maximum value a*max and minimum value a*min of chromaticity component a*, and maximum value b*max and minimum value b*min of chromaticity component b*; hereinafter referred to as "color reproduction range"). When color space optimization process (2) is executed, color reproduction range detection unit 602 reads the color reproduction range for each range of luminance component L* delimited by a predetermined range from hard disk 614. Whenever the color space optimization process (4) is executed, skin tone area discrimination unit 621 discriminates a pixel as a skin tone pixel when the values of luminance component L* and chromaticity components a* and b* of said pixel are within a predetermined range determined by a user (i.e., Ls*min to Ls*max, as*min to as*max, and bs*min to bs*max), and outputs high level skin tone signals to skin tone area memory unit 623. The address of the aforesaid pixel is stored in skin tone area memory unit 623 which has received high level skin tone signals. The address signal in this case is generated by address generator 622.

The data L2*, a2*, and b2* decoded by encoding/decoding process unit 604 are respectively input to L2* calculation unit 633, a2* calculation unit 634, and b2* calculation unit 635. The L2* calculation unit 633, a2* calculation unit 634, and b2* calculation unit 635 read the color reproduction range data (i.e., L*min and L*max of luminance component L*, and a*min to a*max of chromaticity component a*, and b*min to b*max of chromaticity component b*) stored in color reproduction detection unit 620, and execute the color space reverse conversion process based on said data. The L2* calculation unit 633, a2* calculation unit 634, and b2* calculation unit 635 read out information regarding color tone areas from hard disk 614 in addition to the aforesaid color reproduction range data when the color space reverse conversion processes (3) and (4) are executed. Furthermore, when color space reverse optimization process (4) is executed, information relating to whether or not the input pixel data relate to a skin tone area is input from skin toner area memory unit 623.

Figure 12:
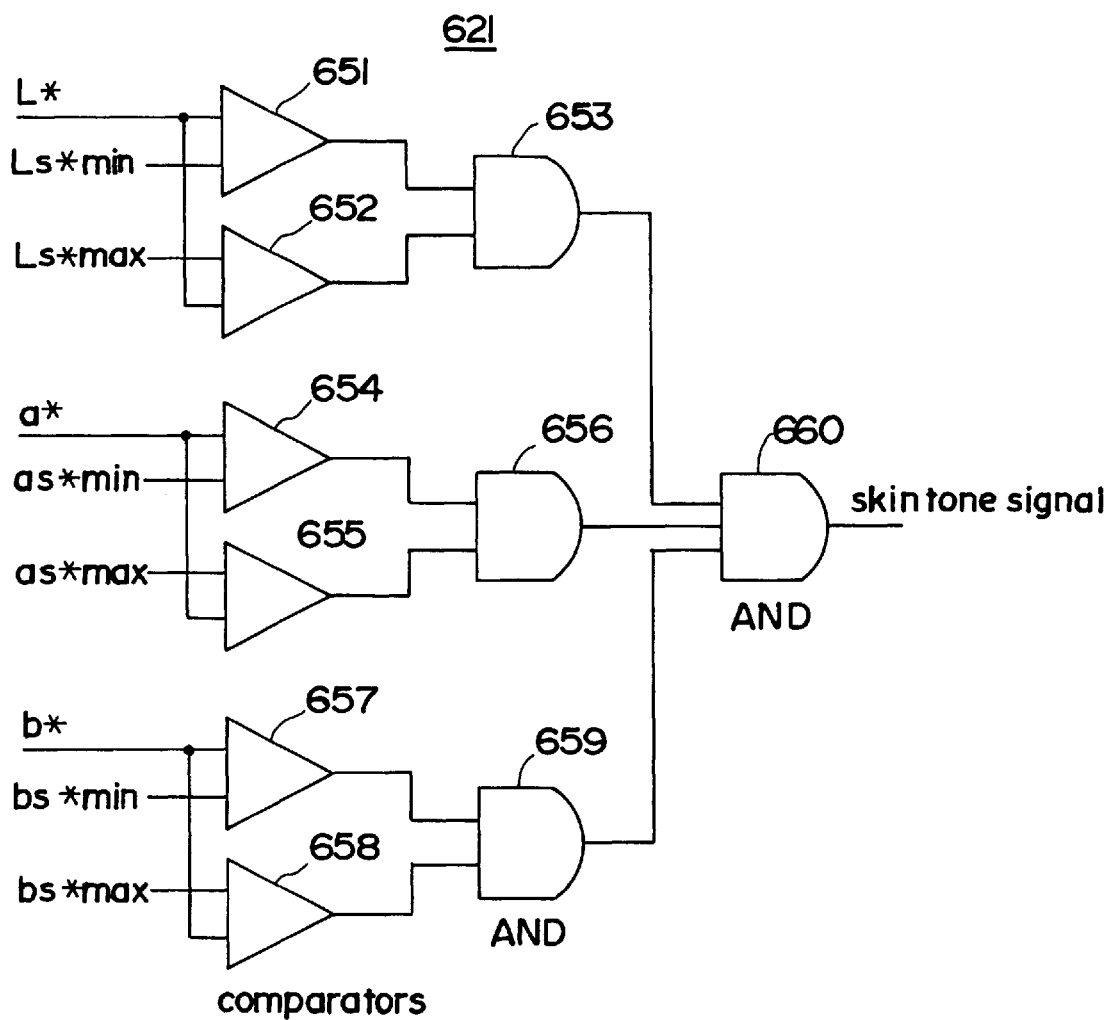
FIG. 12 is a circuit diagram of skin tone discrimination unit 621.

FIG. 12 is a circuit diagram of skin tone discrimination unit 621 outputs a high level skin tone signal when an input pixel is discriminated as a skin tone area pixel. Luminance component L* is input to comparators 651 and 652, which respectively compare said component to the minimum value Ls*min and maximum value Ls*max. Comparator 651 outputs a high level signal when the value of luminance component L* is greater than Ls*min. Comparator 652 outputs a high level signal when the value of luminance component L* less than Ls*max. The AND gate 653 outputs a high level signal when high level signals are input from comparators 651 and 652.

The chromaticity component a* is input to comparators 654 and 655, which respectively compare said component to the minimum value as*min and maximum value as*max of the skin tone area. Comparator 653 outputs a high level signal when the value of chromaticity component a* is greater than as*min. Comparator 654 outputs a high level signal when the value of chromaticity component a* is less than as*max. The AND gate 656 outputs a high level signal when high level signals are input from comparators 653 and 654.

The chromaticity component b* is input to comparators 657 and 658, which respectively compare said component to the minimum value bs*min and maximum value bs*max of the skin tone area. Comparator 657 outputs a high level signal when the value of chromaticity component b* is greater than bs*min. Comparator 658 outputs a high level signal when the value of chromaticity component b* is less than bs*max. The AND gate 659 outputs a high level signal when high level signals are input from comparators 657 and 658.

The AND gate 660 outputs a high level skin tone signal when all signals input from AND gates 653, 656, and 659 are high level signals, i.e., when the value of luminance component L* is within the range of L*max to L*min, and the value of chromaticity component a* is within the range a*max to a*min, and the value of chromaticity component b* is within the range b*max to b*max.

(3-3-2) Color Space Optimization Process

Figure 13:
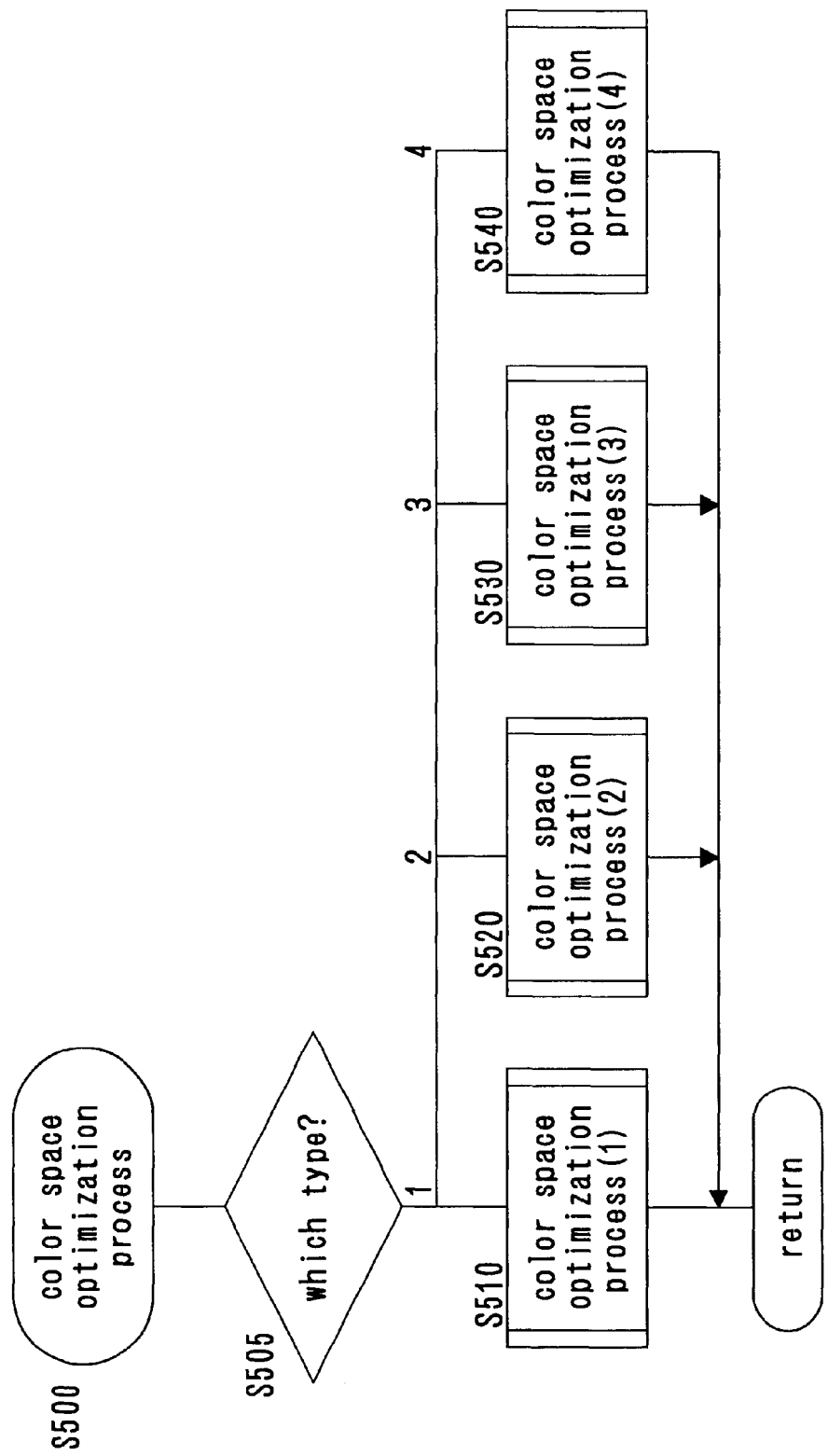
FIG. 13 is a flow chart of the color space optimization process (step S500)

FIG. 13 is a flow chart of the color space optimization process (step S500 in FIG. 9). The type of color space optimization process set by the user in the mode setting process (step S200 in FIG. 10) is determined (step S505).

When color space optimization process (1) is set, and when no selection has been made by a user, the default color space optimization process (1) is executed (step S510). When color space optimization process (2) is set, color space optimization process (2) is executed (step S520). When color space optimization process (3) is set, color space optimization process (3) is executed (step S530). When color space optimization process (4) is set, color space optimization process (4) is executed (step S540).

(3-3-2-1) Color Space Optimization Process(1)

Figure 14:
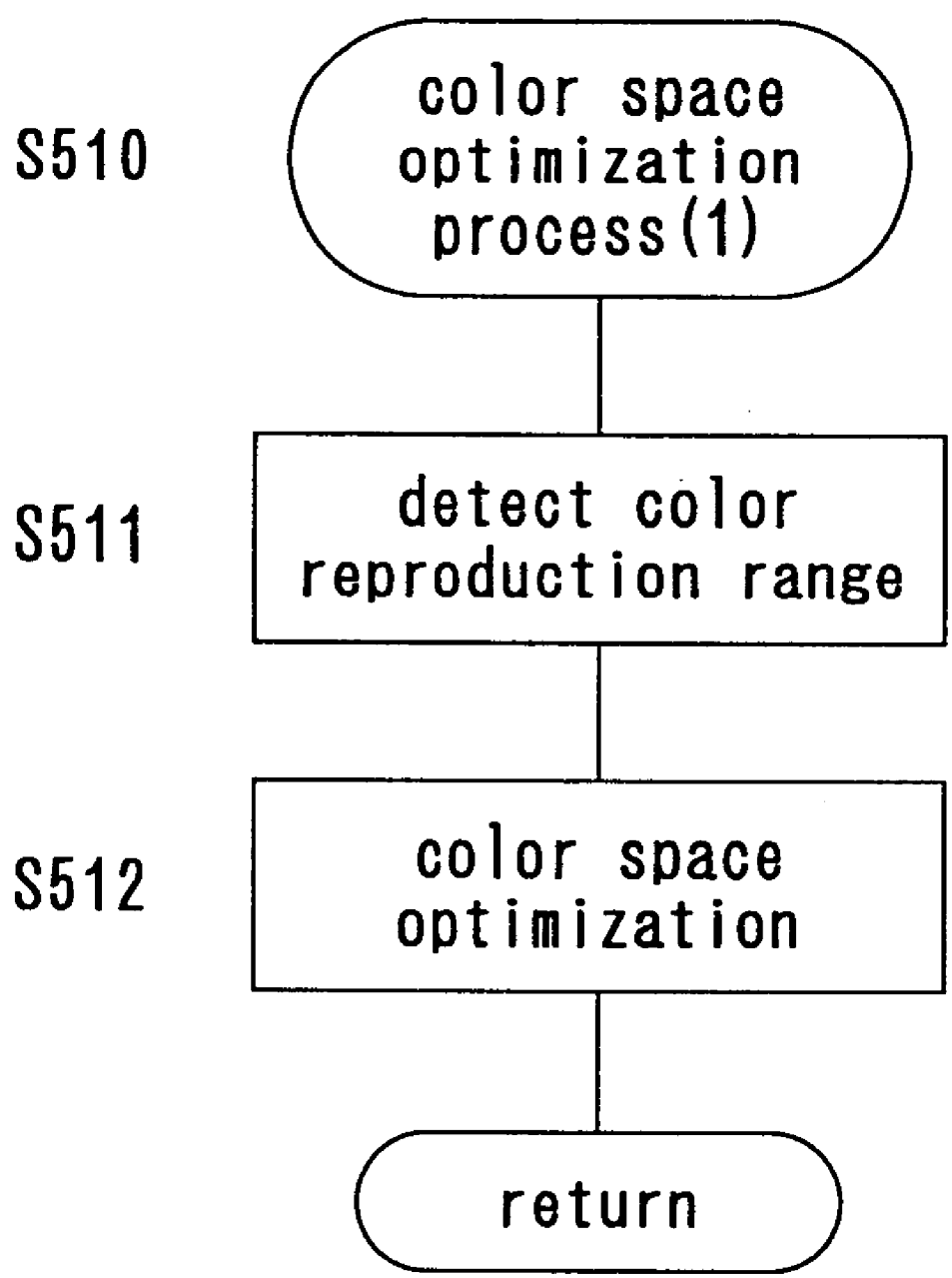
FIG. 14 is a flow chart of the color space optimization process (1) executed in step S502.

FIG. 14 is a flow chart of the color space optimization process (1) (step S510 of FIG. 13). First, the maximum value L*max and minimum value L*min of luminance component L*, maximum value a*max and minimum value a*min of chromaticity component a*, and maximum value b*max and minimum value b*min of chromaticity component b* of a document are determined, and said determined values are stored in color reproduction range detection unit 620 as the color reproduction range (step S511). The color space optimization process is executed by color space optimization process unit 603 based on the graphs shown in FIGS. 7a through 7c (step S512). First, the following calculation shown in Equation 5 are performed relative to luminance component L* to determine luminance component L1*.

$$L1^* = 255/(L^*\max - L^*\min) \times (L^* - L^*\min) \quad (5)$$

The aforesaid calculation process is based on the graph shown in FIG. 7a. That is, in the calculation of Equation 5, the values of luminance component L* distributed in a range of L*min through L*max are changed to values distributed in a range from 0 to 255.

The chromaticity component a* is calculated by Equation 6 below, to determine the chromaticity component a1*. In Equation 6, the value of a1* is processed as 0 (zero) after the optimization process when the value of a* is 0 (zero). This arrangement maintains the situation when the color of a pixel is an achromatic color having both chromaticity components a* and b* at values of 0 (zero).

$$a1^* = 128/a^*\max \times a^* \quad (6)$$

where $0 \leq a^* \leq a^*\max$ $$a1^* = 127/|a^*\min| \times (a^* - a^*\min) - 127$$

where $a^*\min \leq a^* \leq 0$

This calculation process is based on the graph shown in FIG. 7b. That is, in the calculation of Equation 6, each value of a* distributed in a range of 0 to a*max is changed to a value distributed in a range of 0 to 128, and each value of chromaticity component a* distributed in a range of a*min to 0 is changed to a value distributed in a range of −127 to 0.

Chromaticity component b* is used in the calculation of Equation 7 to determine chromaticity component b1*. In Equation 7, the value of b1* is processed as 0 (zero) after the optimization process when the value of b* is 0 (zero). This arrangement maintains the situation when the color of a pixel is an achromatic color having both chromaticity components a* and b* at values of 0 (zero).

$$b1^* = 128/b^*\text{max} \times b^* \qquad (7)$$

where $0 \leq b^* \leq b^*\text{max}$ $$b1^* = 127/|b^*\text{min}| \times (b^* - b^*\text{min}) - 127$$

where $b^*\text{min} \leq b^* \leq 0$

The aforesaid calculation is based on the graph shown in FIG. 7c. That is, in the calculation of Equation 7, each value of b* distributed in a range of 0 to b*max is changed to a value distributed in a range of 0 to 128, and each value of chromaticity component b* distributed in a range of b*min to 0 is changed to a value distributed in a range of −127 to 0.

In the color space optimization process (1) of chromaticity components a* and b*, the maintenance of achromatic color data is accomplished for the following reasons. The mean value information LA and gradient range exponent LD obtained for each block in the GBTC type encoding process express information on mean values and gradients of each pixel within a block. The code data Φij expresses information relating to the value of the data of each pixel. Accordingly, the type of image (solid image, binary image, multi-level image, black-and-white image, color image) relating to the block can be discriminated based on said data. For example, discrimination of whether an image related to a block is a lack-and-white image or color image can be realized by discriminating whether or not the value of gradient range exponent LD of chromaticity components a* and b* is less than a predetermined value. When achromatic color data is lost in the color space optimization process, the aforesaid discrimination is impossible. Thus, achromatic color data are maintained in color space optimization process (1).

The data of document image information L*, a*, and b* used in the calculations of Equations 5 through 7, i.e., maximum values L*max, a*max, b*max, and minimum values L*min, a*min, b*min, are stored beforehand on hard drive 614, and used in the execution of color space optimization process (1).

(3-3-2-2) Color Space Optimization Process (2)

Figure 15B:
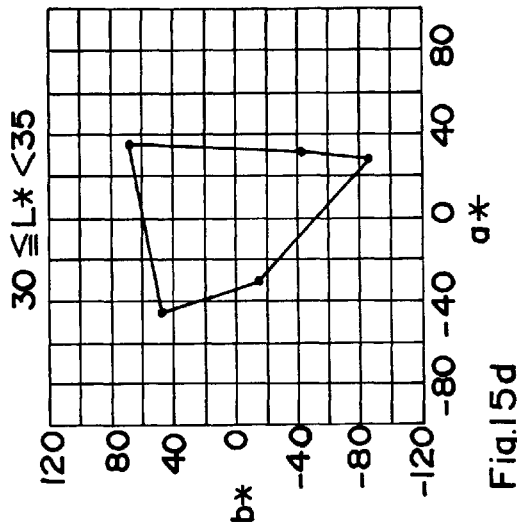
FIGS. 15a through 15d are illustrations showing the current range of data of color components a* and b* present in the a*b* plane at luminance L* of various predetermined ranges.
Figure 15D:
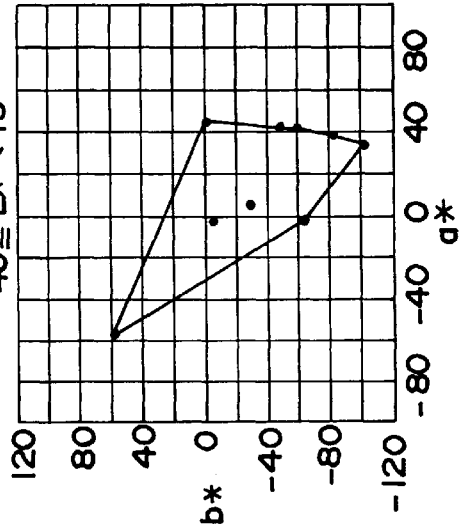
Figure 15A:
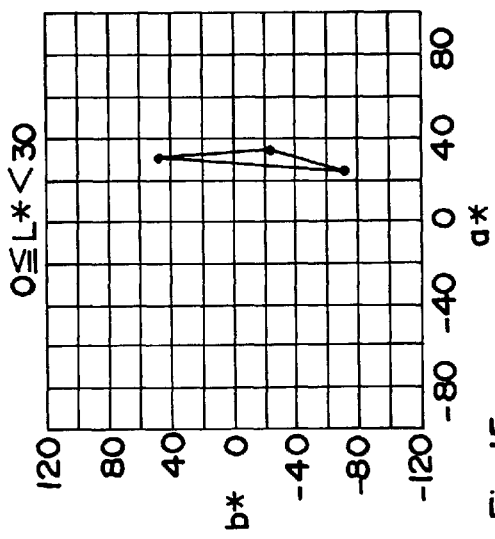
Figure 15C:
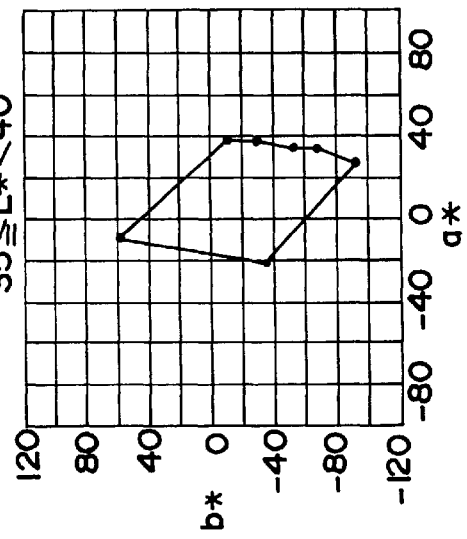
Figure 17A:
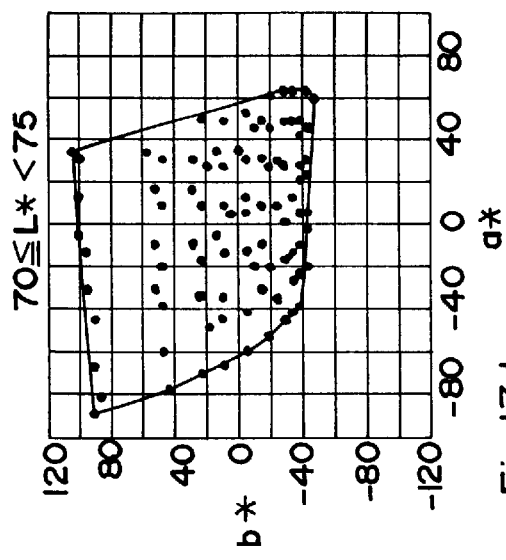
FIGS. 17a through 17d are illustrations showing the current range of data of color components a* and b* present in the a*b* plane at luminance L* of various predetermined ranges.
Figure 17B:
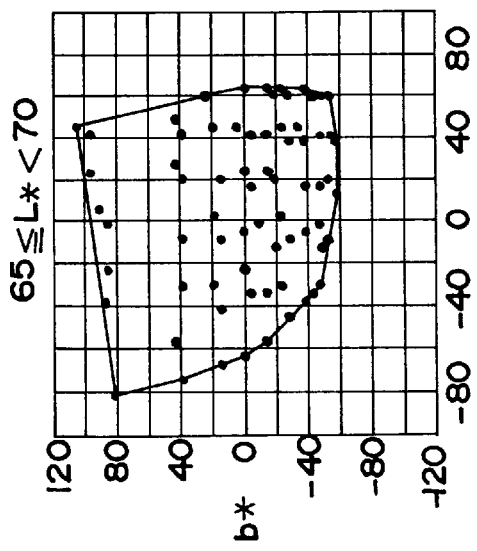
Figure 17C:
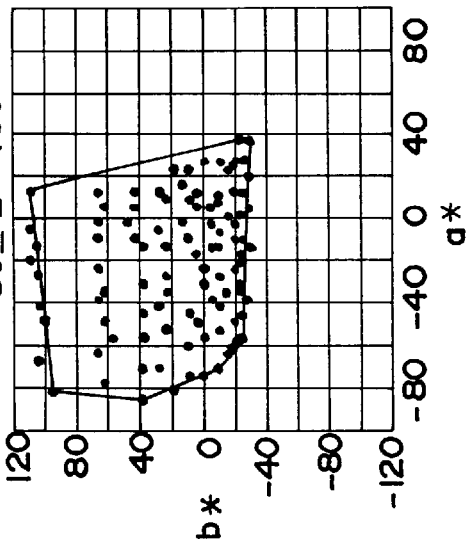
Figure 17D:
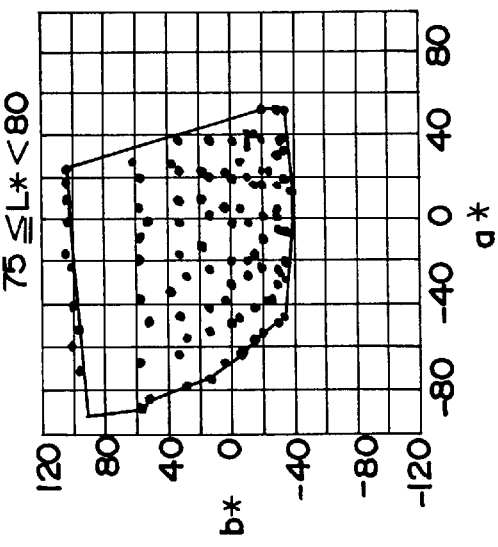

As shown in FIG. 6, the L*a*b* color space is a three dimensional space having luminance L* as an axis. FIGS. 15*a* through 15*d*, FIGS. 16*a* through 16*d*, FIGS. 17*a* through 17*d*, and FIGS. 18*a* through 18*c* illustrate data L*, a*, b* obtained by converting the RGB image data of a standard document comprising 256 specific colors to a L*a*b* colorimetric system, wherein chromaticity components a* and b* present in the a*b* plane at luminance L* of a predetermined range express the current range of said data. The specific a*max, a*min, b*max, b*min in the various drawings are stored on hard disk 614. During the executing of color space optimization process (2), color reproduction range detection unit 620 reads from hard disk 614 the color reproduction range of each range of luminance L* delimited by a predetermined range. As can be understood from FIGS. 15*a* and 18*c*, when the value of luminance L* is less than 30 or greater than 100, the number of datum present in the a*b* plane is extremely low, the data range is narrow. That is, the chromaticity components a* and b* use only a small range among values obtained from the range of −127 to 128 via the value of luminance L*. As previously described, the encoding process and decoding process in the GBTC method are executed based on the value of image data Xij of 16 pixels present in a 4×4 pixel block. A plurality of coefficients among the various coefficients used during the encoding and deciding processes are determined by division. When there is slight difference among values of image data of each pixel, these differences are lost during the calculations, thereby reducing the precision of image data decoding.

Therefore, in color space optimization process (2), the value of luminance component L* is delimited by predetermined ranges, and in the present embodiment is optimized in a distribution from −127 to 128, such that the distribution of data of chromaticity component a* and b* in each range is redistributed from a minimum value to a maximum value of chromaticity components a* and b* within the respective color spaces.

Figure 19:
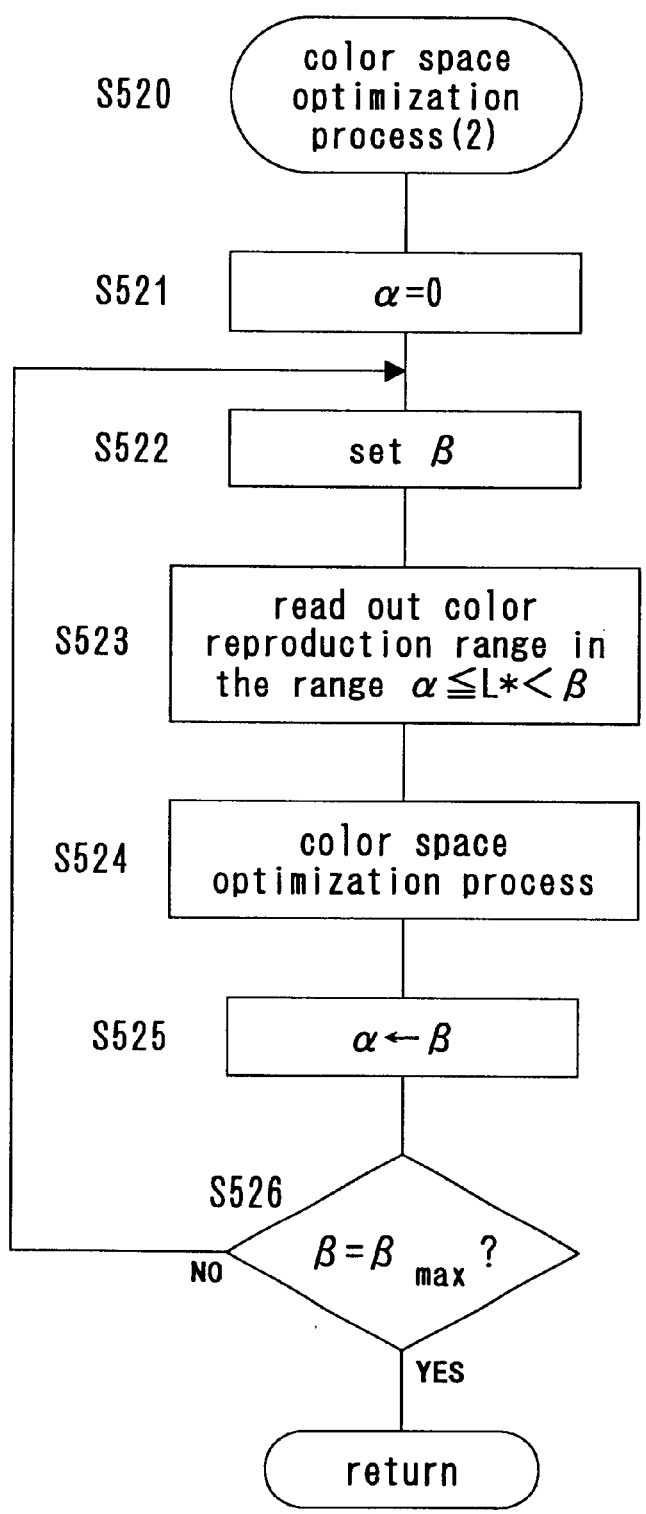
FIG. 19 is a flow chart of color space optimization process (2)

FIG. 19 is a flow chart of the color space optimization process (2) (step S520 in FIG. 13). First, a=0 is set as the initial setting (step S521). Then, the value of b is set (step S522). When the process starts, the setting is b=30. The values of a*max and a*min, and b*max and b*min previously stored on hard disk 614 are read therefrom as the color reproduction range in the range a≦L*<b (step S523). For example, in the case of FIG. 15*a*, a*max is 40 and a*min is 20, b*max is 60 and b*min is −80. The a*calculation unit 631 and b* calculation unit 632 execute optimization based on the graphs of FIGS. 20*a* and 20*b* (step S524). The a* calculation unit 631 performs the calculation of Equation 8 for chromaticity component a*.

$$a1^* = 255/(a^*\text{max} - a^*\text{min}) \times (a^* - a^*\text{min}) - 127 \qquad (8)$$

The b* calculation unit 632 performs the calculation of Equation 9 for chromaticity component b*.

$$b1^* = 255/(b^*\text{max} - b^*\text{min}) \times (b^* - b^*\text{min}) - 127 \qquad (9)$$

Thereafter, the value of a is substituted by the value of b (step S525). If the value of b is not a predetermined maximum value bmax (step S526: NO), the new b value is set (step S522) In the present embodiment, the value of b is at increments of five from a value of 30, i.e., 35, 40, 45 . . . 90, 95, 100. The value of bmax is 100. The aforesaid process is repeatedly executed until the value of b attains a predetermined maximum value bmax.

Figure 21A:
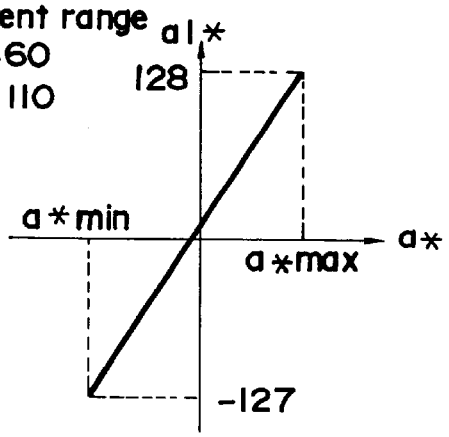
FIGS. 21a and 21b are graphs used in the color space optimization process (2) executed when luminance component L* is in a range of $60 \leq L^* < 65$.
Figure 21B:
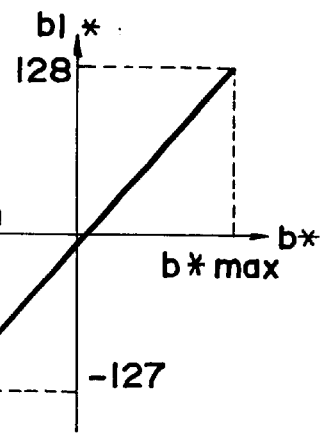

FIG. 16*d* illustrates the current range of data of chromaticity components a* and b* present in the a*b* plane in a range 60£L*<65. In this instance, a*max is 60 and a*min is −70, and b*max is 110 and b*min is −70. The a* calculation unit 631 and b* calculation unit 632 perform optimizations based on the graphs in FIGS. 21*a* and 21*b*.

Figure 18B:
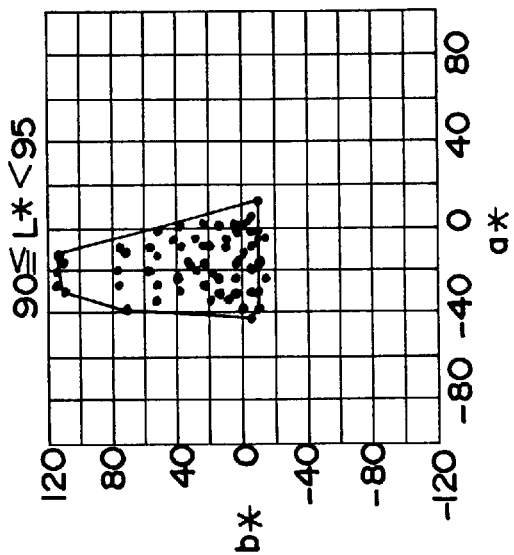
FIGS. 18a through 18c are illustrations showing the current range of data of color components a* and b* present in the a*b* plane at luminance L* of various predetermined ranges.
Figure 18A:
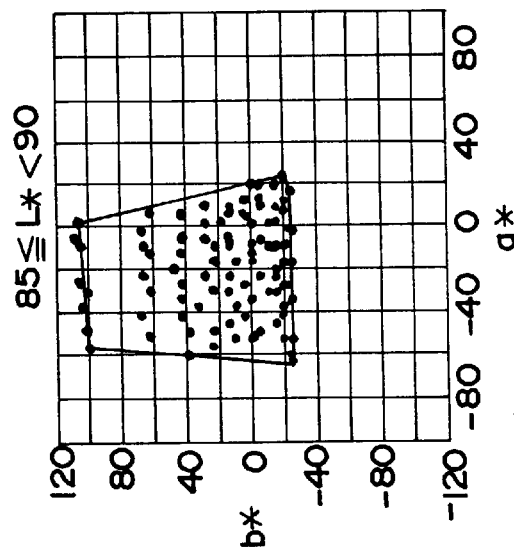
Figure 18C:
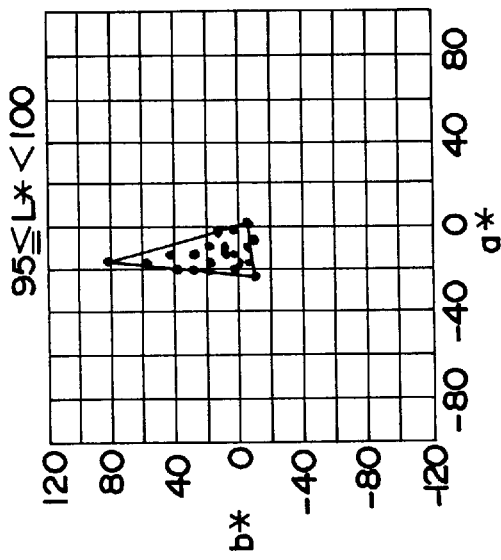
Figure 22A:
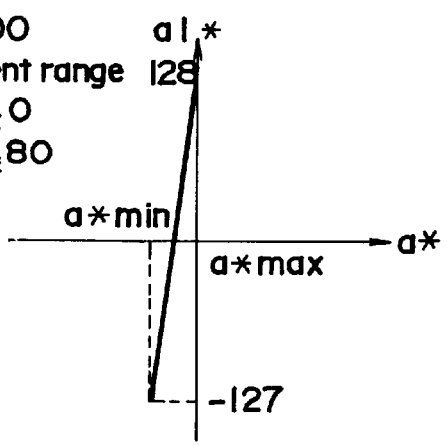
FIGS. 22a and 22b are graphs used in the color space optimization process (2) executed when luminance component L* is in a range of $95 \leq L^* < 100$.
Figure 22B:
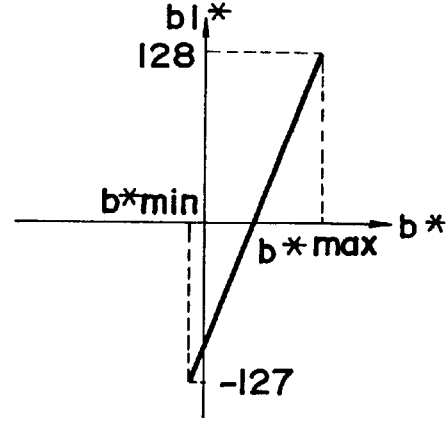

FIG. 18*c* illustrates the current range of data of chromaticity components a* and b* present in the a*b* plane in a range 95≦L*<100. In this instance, a*max is 0 and a*min is −30, and b*max is 80 and b*min is −10. The a* calculation unit 631 and b* calculation unit 632 perform optimizations based on the graphs in FIGS. 22*a* and 22*b*.

Although optimization is performed on all ranges in the present embodiment, the invention is not limited such an arrangement. For example, optimization may be performed only on ranges having low luminance or ranges having high luminance in a narrow range of chromaticity components a* and b* in the a*b* plane.

(3-3-2-3) Color Space Optimization Process(3)

In color space optimization process (3), in order to improve skin tone reproducibility, bits are allocated for the luminance component L*, and chromaticity components a* and b* in the skin tone range set by a user so as to produce a wider skin tone range than other ranges. Skin tone range information (luminance component Ls*max and Ls*min, chromaticity component as*max and as*min, chromaticity component bs*max and bs*min) are set by the user when the color space optimization process (3) is set. For example, as shown in FIG. 23*a*, specific L* within the range from Ls*min to Ls*max are distributed in a wider range than specific L* outside said range. Thus, skin tone range color reproducibility is improved.

Figure 23B:
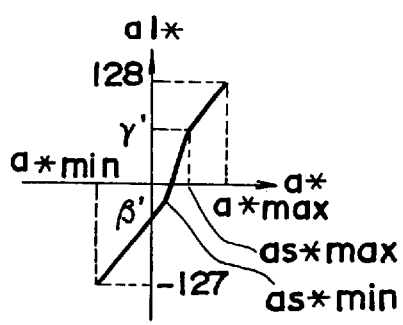
Figure 23C:
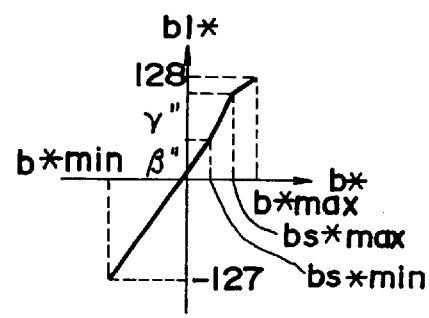
Figure 24:
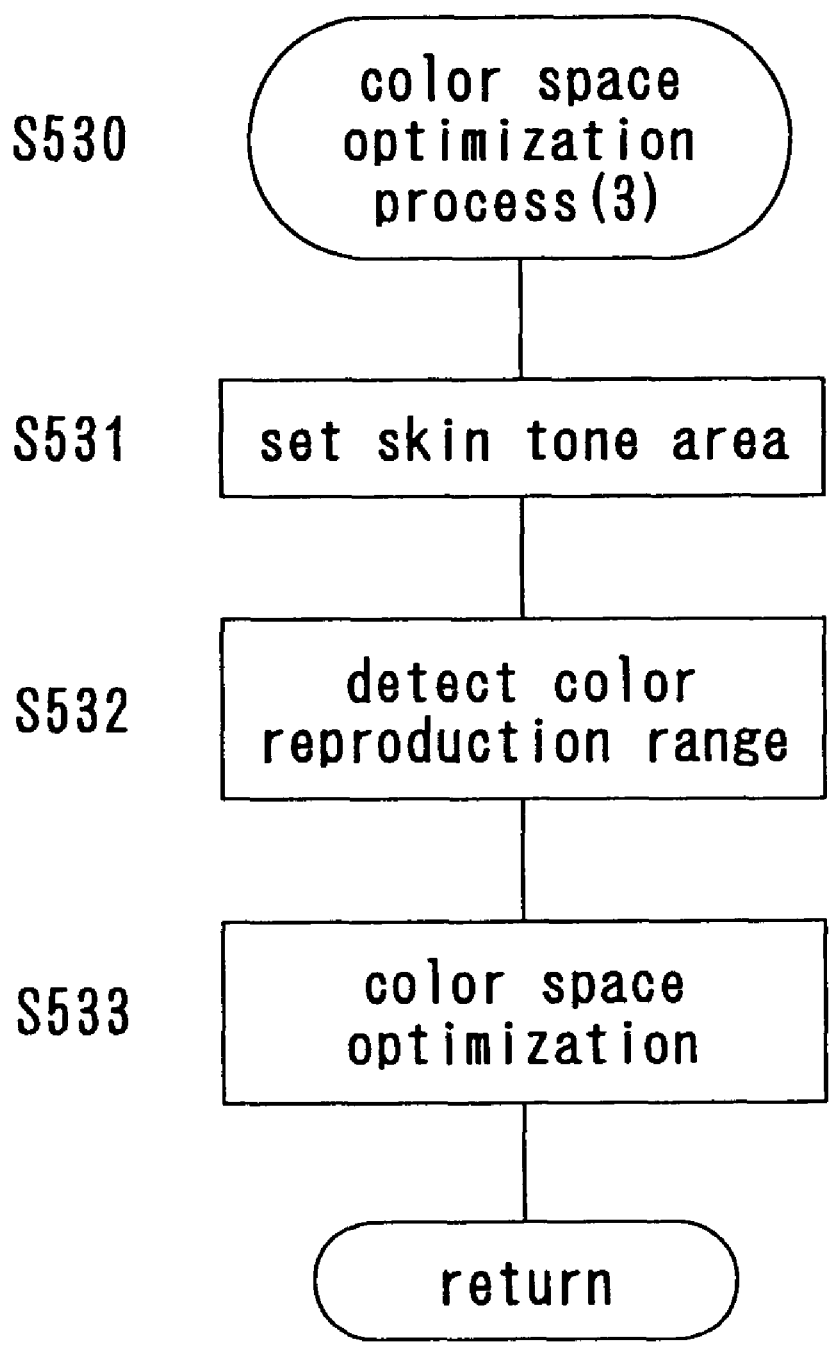
FIG. 24 is a flow chart of color space optimization process (3)

FIG. 24 is a flow chart of color space optimization process (3) (step S530 in FIG. 13). First, information relating to the skin tone range stored on hard disk 614 (i.e., luminance component maximum value Ls*max and minimum value Ls*min, chromaticity component maximum value as*max and minimum value as*min, chromaticity component maximum value bs*max and minimum value bs*min) are read therefrom, and the read values are set in skin tone discrimination unit 621 (step S531). The color reproduction range detection unit 620 detects and stores the luminance component maximum value Ls*max and minimum value Ls*min, chromaticity component maximum value as*max and minimum value as*min, chromaticity component maximum value bs*max and minimum value bs*min (step S532). The L* calculation unit 630, a* calculation unit 631, and b* calculation unit 632 execute optimizations based on the graphs shown in FIGS. 23a through 23c (step S524). In color space optimization process (3), the skin tone area data set by the user are optimized so as to be distributed in a range which is a-fold larger than the original (where a is a value larger than 1).

The L* calculation unit 630 performs the calculation of Equation 10 based on the values of L*max and L*min detected by color reproduction range detection unit 620, and the values Ls*max and Ls*min set in skin tone discrimination unit 621, so as to change the distribution of luminance component L* to a standard distribution of 0 to 255. In Equation 10 shown below, the difference between L*max and L*min is designated LM, and the difference between Ls*max and Ls*min is designated LMs. To facilitate understanding of the equation, the value of luminance component L1* is designated a when the value of luminance component L* is Ls*min. Similarly, the value of luminance component L1* is designated b when the value of luminance component L* is Ls*max.

$$Ll^* = \frac{255 - \alpha \cdot LMs}{LM - LMs} \times (L^* - L^*\min) \tag{10}$$

where L*min≦L*≦Ls*min $$L1^* = \alpha(L^* - Ls^*\min) + \beta$$

where Ls*min≦L*≦Ls*max $$Ll^* = \frac{255 - \alpha \cdot LMs}{LM - LMs} \times (L^* - Ls^*\max) + \gamma$$

where Ls*max≦L*≦L*max

The values of a and b are stored on hard disk 614, and used in color space reverse conversion process (3) described later.

The a* calculation unit 631 performs the calculation of Equation 11 based on the values of a*max and a*min detected by color reproduction range detection unit 620, and the values of as*max and as*min set by skin tone discrimination unit 621, so as to change the distribution of chromaticity component a* to a standard distribution of −127 to 128. In Equation 11, the difference between a*max and a*min is designated aM, and the difference between as*max and as*min is designated aMs. Furthermore, the value of chromaticity component a1* is designated a' when the value of chromaticity component a* is as*min. Similarly, the value of chromaticity component a1* is designated b' when the value of chromaticity component a* is as*max.

$$a1^* = \frac{255 - \alpha \cdot aMs}{aM - aMs} \times (a^* - a^*\min) - 127 \tag{11}$$

where a*min≦a*≦as*min $$a1^* = \alpha(a^* - as^*\min) + \beta' - 127$$

where as*min≦a*≦as*max $$a1^* = \frac{255 - \alpha \cdot aMs}{aM - aMs} \times (a^* - as^*\max) + \gamma' - 127$$

where as*max≦a*≦a*max

The values of a' and b' are stored on hard disk 614, and used in color space reverse conversion process (3) described later.

The b* calculation unit 632 performs the calculation of Equation 12 based on the values of b*max and b*min detected by color reproduction range detection unit 620, and the values of bs*max and bs*min set by skin tone discrimination unit 621, so as to change the distribution of chromaticity component b* to a standard distribution of −127 to 128. In Equation 12, the difference between b*max and b*min is designated bM, and the difference between bs*max and bs*min is designated bMs. Furthermore, the value of chromaticity component b1* is designated a" when the value of chromaticity component b* is bs*min. Similarly, the value of chromaticity component b1* is designated b" when the value of chromaticity component b* is bs*max.

$$b1^* = \frac{255 - \alpha \cdot bMs}{bM - bMs} \times (b^* - b^*\min) - 127 \tag{12}$$

where b*min≦b*≦bs*min $$b1^* = \alpha(b^* - bs^*\min) + \beta' - 127$$

where bs*min≦b*≦bs*max $$b1^* = \frac{255 - \alpha \cdot bMs}{bM - bMs} \times (b^* - bs^*\max) + \gamma' - 127$$

where bs*max≦b*≦b*max

The values of a" and b" are stored on hard disk 614, and used in color space reverse conversion process (3) described later.

(3-3-2-4) Color Space Optimization Process (4)

In color space optimization process (4), in order to improve skin tone reproducibility, pixels related to the skin tone area are detected from image data, and the data of pixels related to the detected skin tone area are optimized separately from the data related to other areas. For example, luminance component L* of pixels outside the skin tone area are changed to a standard distribution from 0 to 255 based on the graph of FIG. 25a. On the other hand, luminance component L* of pixels within the range of the skin tone area (Ls*min≦L*≦Ls*max, as*min≦a*≦as*max, bs*min≦b*≦bs*max) are changed to a standard distribution of 0 to 255 based on the graph of FIG. 25d. Thus, the reproducibility is improved for skin tone area, and the reproducibility is improved for non-skin tone areas.

Figure 26:
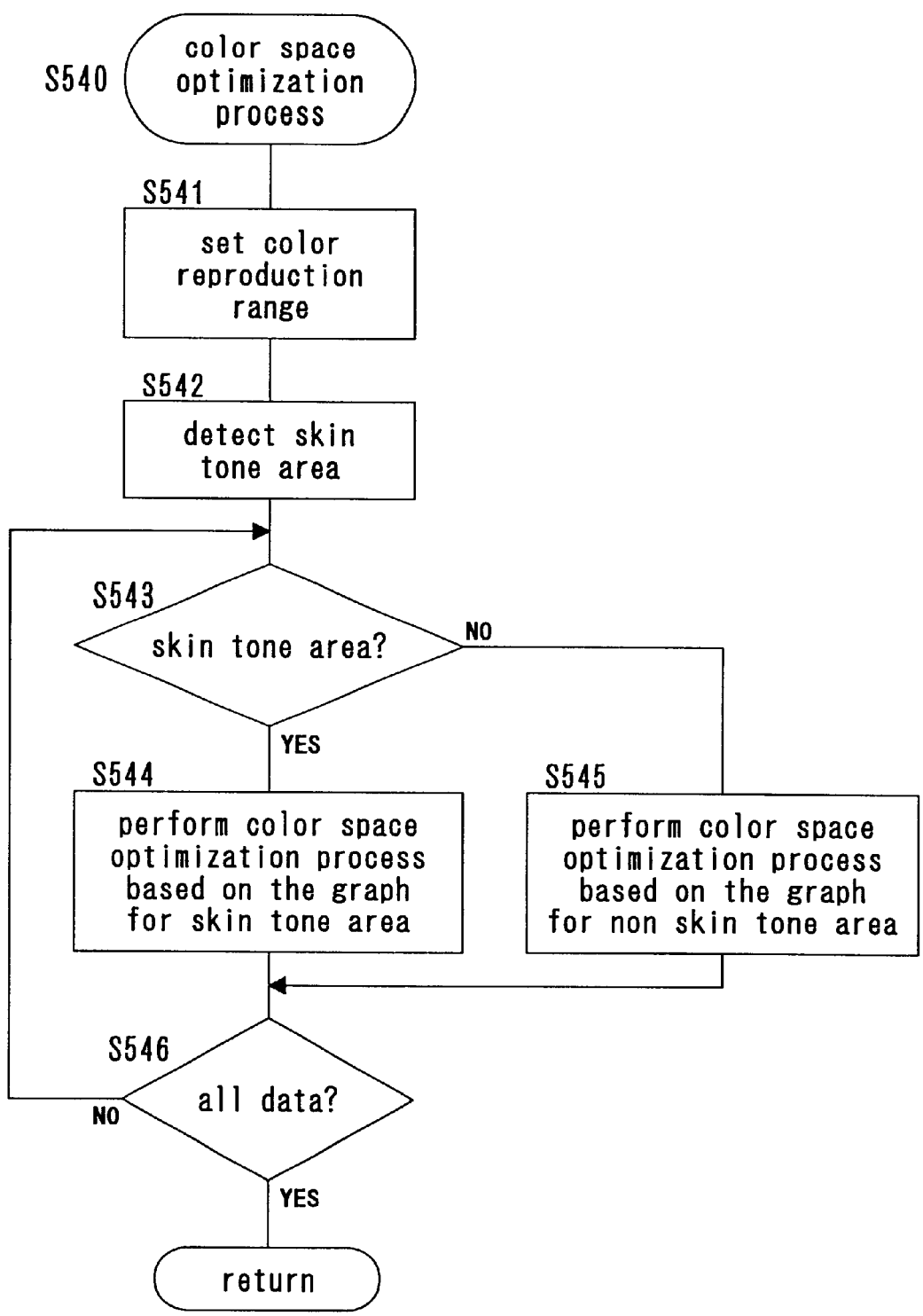
FIG. 26 is a flow chart of color space optimization process (4)

FIG. 26 is a flow chart of the color space optimization process (4) (step S540 in FIG. 13). First, the various values of luminance component L* maximum value Ls*max and minimum value Ls*min, chromaticity component a* maximum value as*max and minimum value as*min, chromaticity component b* maximum value bs*max and minimum value bs*min which are determined to be in the skin tone area are read from hard disk 614 and set in skin tone discrimination unit 621 (step S541). Then, color reproduction range detection unit 620 detects and stores the luminance component L* maximum value L*max and minimum value L*min, chromaticity component a* maximum value a*max and minimum value a*min, and chromaticity component b* maximum value b*max and minimum value b*min (step S542). As previously described, skin tone discrimination unit 621 outputs a high level skin tone signal to skin tone area memory unit 623 when the values of input luminance component L*, and chromaticity components a* and b* relate to the skin tone area set by a user. When even one of the input luminance component L*, and chromaticity components a* and b* is outside the skin tone area (step S543: NO), L* calculation unit 630 and a* calculation unit 631 and b* calculation unit 632 perform the optimization processes based on the graphs of FIGS. 25a through 25c (step S545).

L* calculation unit 630 executes the calculation of Equation 13 below to determined the luminance component L1*.

$$L1^* = 255/(L^*\max - L^*\min) \times (L^* \times L^*\min) \quad (13)$$

This calculation process is accomplished based on the graph of FIG. 25a. That is, in the calculation of Equation 13, the value of luminance component L* of pixels outside the skin tone area distributed in a range L*min to L*max are redistributed throughout the entire range of 0 to 255.

The a* calculation unit 631 performs the calculation of Equation 14 to determine the chromaticity component a1*.

$$a1^* = 255/(a^*\max - a^*\min) \times (a^* - a^*\min) - 127 \quad (14)$$

This calculation process is accomplished based on the graph of FIG. 25b. That is, in the calculation of Equation 14, the value of chromaticity component a* of pixels outside the skin tone area distributed in a range a*min to a*max are redistributed throughout the entire range of −127 to 128.

The b* calculation unit 632 performs the calculation of Equation 15 to determine the chromaticity component b1*.

$$b1^* = 255/(b^*\max - b^*\min) \times (b^* - b^*\min) - 127 \quad (15)$$

This calculation process is accomplished based on the graph of FIG. 25c. That is, in the calculation of Equation 15, the value of chromaticity component b* of pixels outside the skin tone area distributed in a range b*min to b*max are redistributed throughout the entire range of −127 to 128.

When all of the input luminance component L*, and chromaticity components a* and b* are within the skin tone area (step S543: YES), skin tone discrimination unit 621 output a high level skin tone signal to skin tone area memory unit 623. The skin tone area memory unit 623 stores addresses input from address generator 622 in accordance with input high level skin tone signal. The addresses stored in skin tone area memory unit 623 are used to discriminate pixels related to the skin tone area and pixels outside the skin tone area when color space optimization process (4) is executed. The L* calculation unit 630, a* calculation unit 631, and b* calculation unit 632 perform optimization processes based on the graphs of FIGS. 25d through 25f (step S544).

The L* calculation unit 630 performs calculation of Equation 16 below to determine the luminance component L1*.

$$L1^* = 255/(Ls^*\max - Ls^*\min) \times (L^* - Ls^*\min) \quad (16)$$

This calculation process is accomplished based on the graph of FIG. 25d. That is, in the calculation of Equation 16, the value of luminance component L* distributed in a range Ls*min to Ls*max are redistributed throughout the entire range of 0 to 255.

The a* calculation unit 631 performs the calculation of Equation 17 to determine the chromaticity component a1*.

$$a1^* = 255/(as^*\max - as^*\min) \times (a^* - as^*\min) - 127 \quad (17)$$

This calculation process is accomplished based on the graph of FIG. 25e. That is, in the calculation of Equation 17, the values of chromaticity component a* distributed in a range as min to as*max are redistributed throughout the entire range of −127 to 128.

The b* calculation unit 632 performs the calculation of Equation 18 to determine the chromaticity component b1*.

$$b1^* = 255/(bs^*\max - bs^*\min) \times (b^* - bs^*\min) - 127 \quad (18)$$

This calculation process is accomplished based on the graph of FIG. 25f. That is, in the calculation of Equation 18, the values of chromaticity component b* distributed in a range bs*min to bs*max are redistributed throughout the entire range of −127 to 128.

(3-3-3) Color Space Reverse Optimization Process

Figure 27:
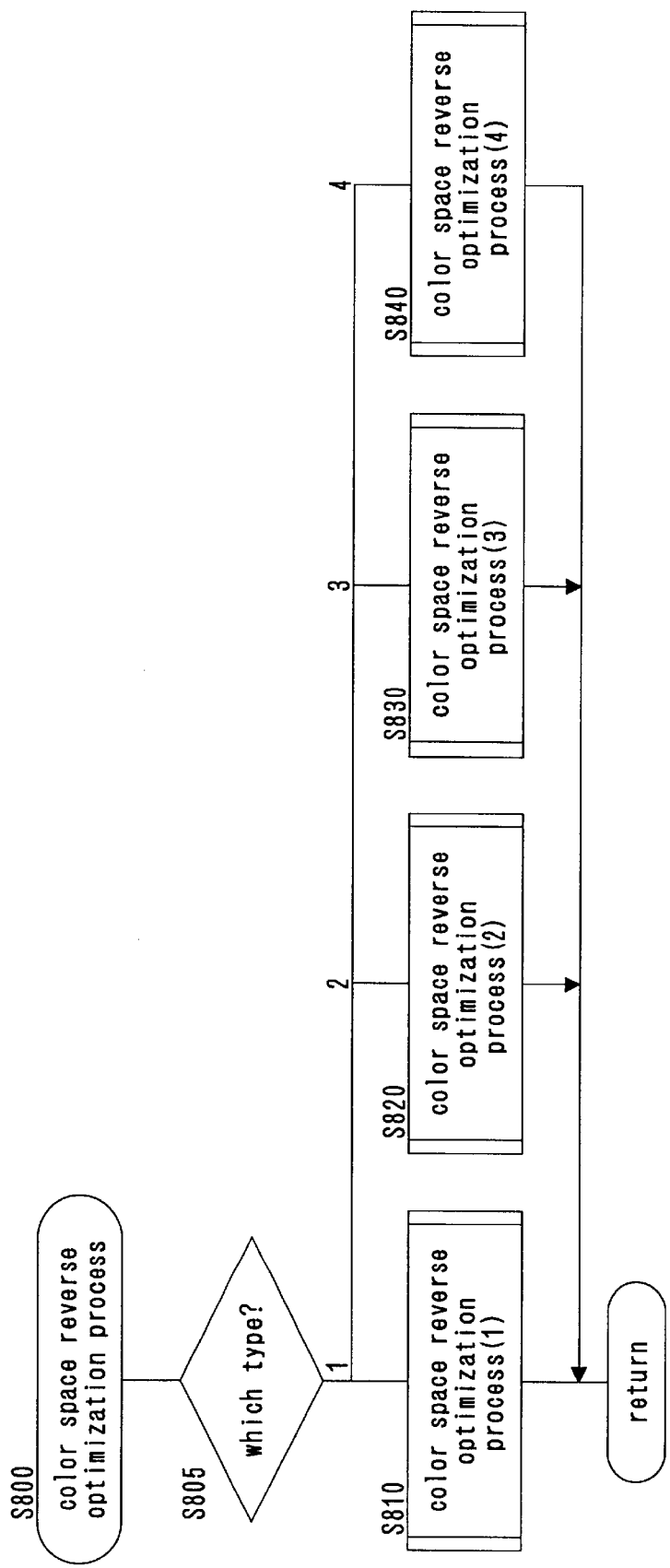
FIG. 27 is a flow chart of the color space reverse optimization process (step S800)

FIG. 27 is a flow chart of the color space reverse optimization process (step S800). The type of optimization process set by the user is discriminated (step S805). When color space optimization process (1) has been set, the color space reverse optimization process (1) is executed (step S810). When color space optimization process (2) has been set, the color space reverse optimization process (2) is executed (step S820). When color space optimization process (3) has been set, the color space reverse optimization process (3) is executed (step S820). When color space optimization process (4) has been set, the color space reverse optimization process (4) is executed (step S840).

(3-3-3-1) Color Space Reverse Optimization Process (1)

Figure 28:
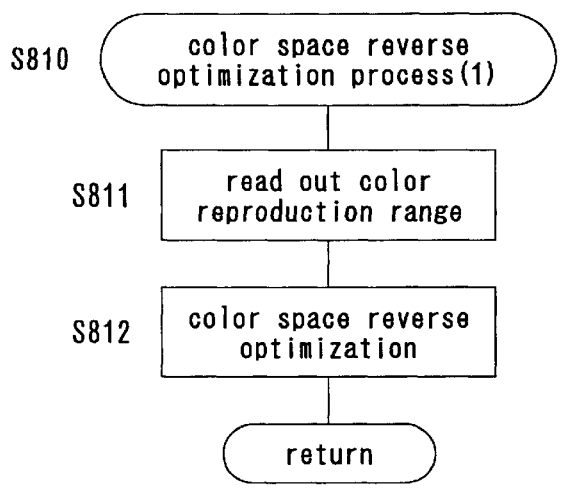
FIG. 28 is a flow chart of the color space reverse optimization process (1)

When color space optimization process (1) has been executed by color space optimization process unit 603, the color space reverse optimization process (1) is correspondingly executed by color space reverse optimization process unit 605 (step S810 in FIG. 27). FIG. 28 is a flow chart of the color space reverse optimization process (1). First, luminance component maximum value L*max and minimum value L*min, chromaticity component maximum value a*max and minimum value a*min, chromaticity component maximum value b*max and minimum value b*min are read from hard disk 614 (step S811). Using the read data, the distribution of the data of encoded luminance component L2*, chromaticity components a2* and b2* are restored to the original data L*max through L*min, a*max through a*min, and b*max through b*min (step S812). These processes are executed based on the graphs of FIGS. 8a through 8c. That is, luminance component L2* is subjected to a calculation process of Equation 19 below to restore luminance component L3* distributed from L*max through L*min.

$$L3^* = (L^*\max - L^*\min)/255 \times L2^* + L^*\min \quad (19)$$

The chromaticity component a2* is subjected to the calculations of Equation 20 below to restore chromaticity component a3* distributed from a*max through a*min.

$$a3^* = a^*\max/128 \times a2^* \quad (20)$$

where $0 \leq a^* \leq 128$ $$a3^* = 127/|a^*\min| \times (a^*+127) + a^*\min$$

where $-127 \leq a^* \leq 0$

The chromaticity component b2* is subjected to calculation of Equation 21 to restore chromaticity component b3* distributed from b*max through b*min.

$$b3^* = b^*\max/128 \times a2^* \quad (21)$$

where $0 \leq b^* \leq 128$ $$b3^* = 127/|b^*\min| \times (b^*+127) + b^*\min$$

where $-127 \leq b^* \leq 0$ (3-3-3-2) Color Space Reverse Optimization Process (2)

Figure 29:
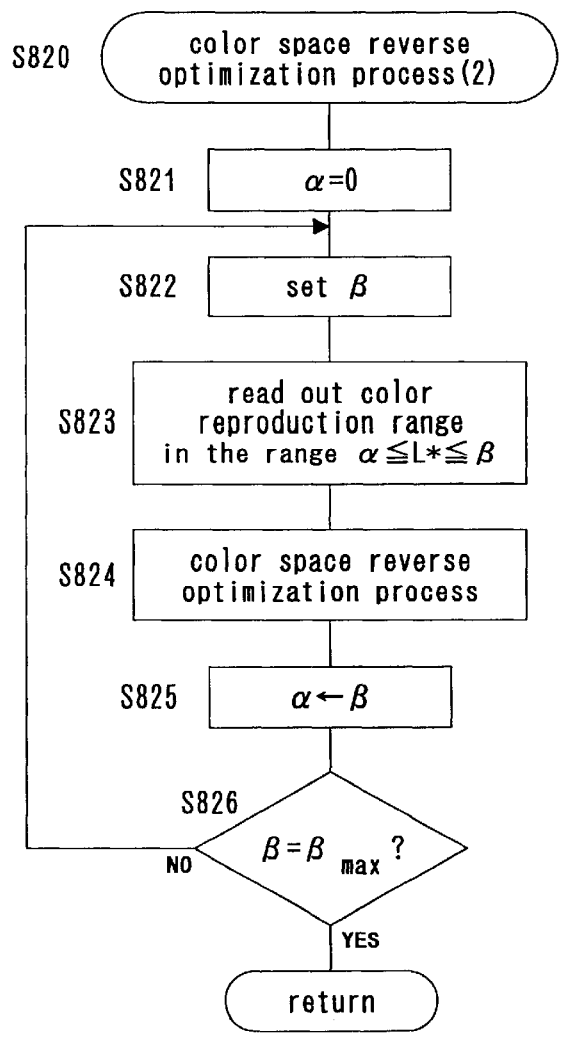
FIG. 29 is a flow chart of the color space reverse optimization process (2)
Figure 30A:
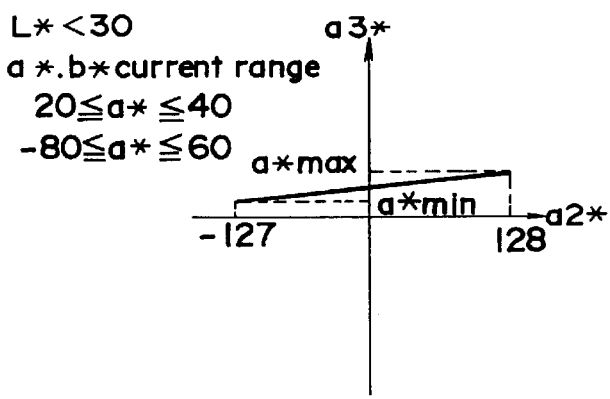
FIGS. 30a and 30b are graphs used in the color space reverse optimization process (2) executed when luminance component L* is in a range of $0 \leq L^* \leq 30$.
Figure 30B:
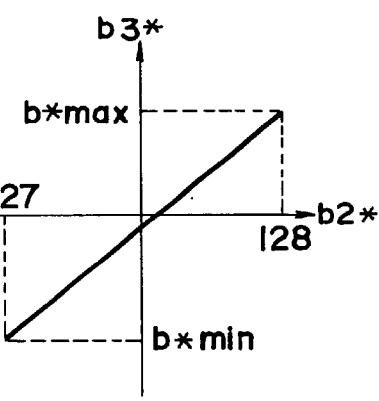

When color space optimization process (2) has been executed by color space optimization process unit 603, the color space reverse optimization process (2) is executed by color space reverse optimization process unit 605 (step S820 in FIG. 27). FIG. 29 is a flow chart of the color space reverse optimization process (2). First, a=0 is set as the initial setting (step S821). Then, the value of b is set (step S822). When the process starts, the value of b is set at b=30. The maximum value a*max and minimum value a*min of chromaticity component a*, and maximum value b*max and minimum value b*min of chromaticity component b* corresponding to values a and b and previously stored on hard disk 614 are read therefrom (step S823). For example, when a=0 and b=30, the values read from hard disk 614 are a*max=40 and a*min=20, b*max=60 and b*min=−80. The a*calculation unit 631 and b* calculation unit 632 execute reverse optimization based on the graphs of FIGS. 30a and 30b (step S824). The a2* calculation unit 634 performs the calculation of Equation 22 for chromaticity component a*.

$$a3^* = (a^*\max - a^*\min)/255 \times (a2^*+127) + a^*\min \quad (22)$$

The b2* calculation unit 635 performs the calculation of Equation 23 for chromaticity component b*.

$$b3^* = (b^*\max - b^*\min)/255 \times (b2^*+127) + b^*\min \quad (23)$$

Figure 31A:
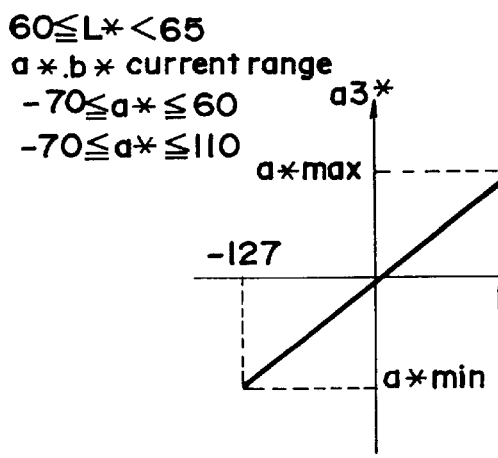
FIGS. 31a and 31b are graphs used in the color space reverse optimization process (2) executed when luminance component L* is in a range of $60 \leq L^* \leq 65$.
Figure 31B:
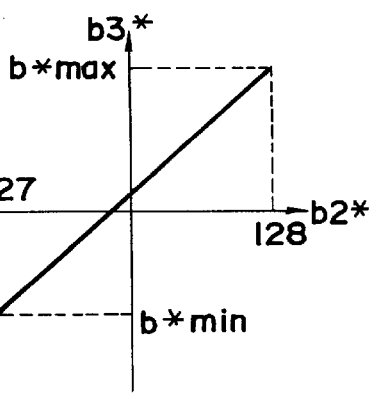

After the calculations of Equations 22 and 23, the value of a is substituted by the value of b (step s825). If the value of b is not a predetermined maximum value bmax (step S826: no), this value is set as the new b (step S822). The value of b is at increments of five from a value of 30, i.e., 35, 40, 45 . . . 90, 95, 100. The value of bmax is 100. The aforesaid process is repeatedly executed until the value of b attains a predetermined maximum value bmax. For example, when a=60 and b=65, the values read from hard disk 614 are a*max=60 and a*min=−70, b*max=110 and b*min=−70. The a2* calculation unit 634 and b2* calculation unit 635 execute reverse optimization based on the graphs of FIGS. 31a and 31b.

Figure 32A:
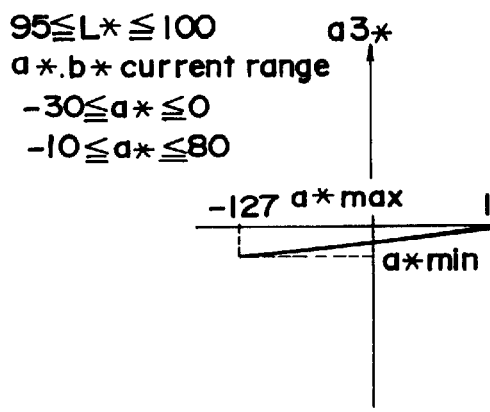
FIGS. 32a and 32b are graphs used in the color space reverse optimization process (2) executed when luminance component L* is in a range of $95 \leq L^* \leq 100$.
Figure 32B:
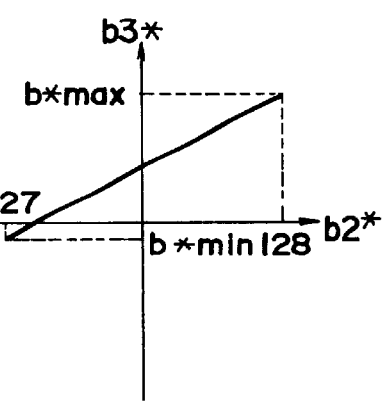

When a=95 and b=100, the values read from hard disk 614 are a*max=0 and a*min=−30, b*max=80 and b*min=−10. The a2* calculation unit 634 and b2* calculation unit 635 execute reverse optimization based on the graphs of FIGS. 32a and 32b.

(3-3-3-3) Color Space Reverse Optimization Process (3)

Figure 33:
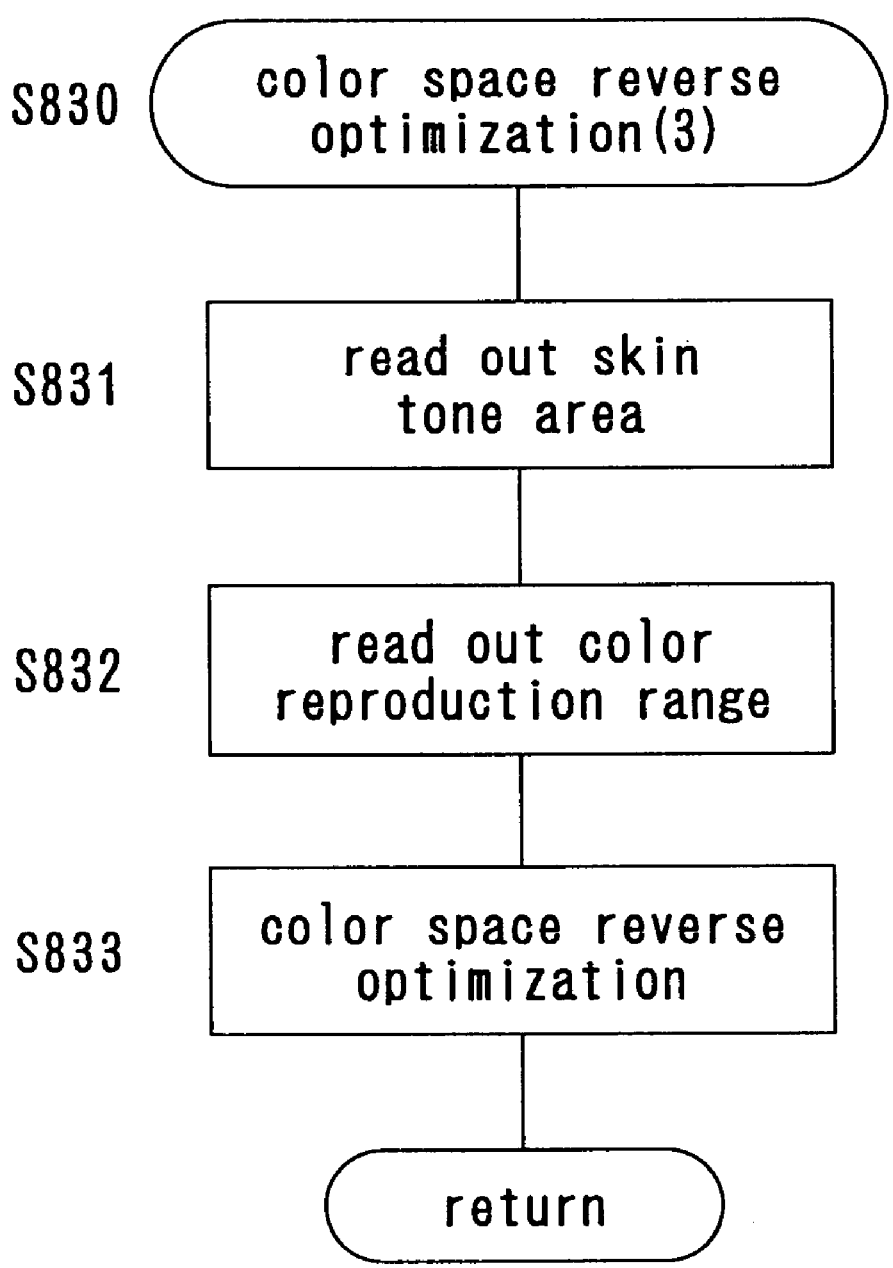
FIG. 33 is a flow chart of the color space reverse optimization process (3)
Figure 34A:
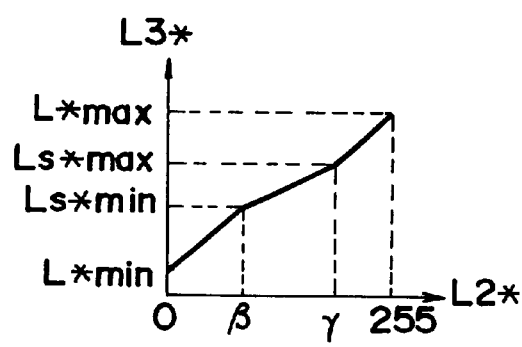
FIGS. 34a through 34c are graphs used by color space reverse optimization process (3)
Figure 34B:
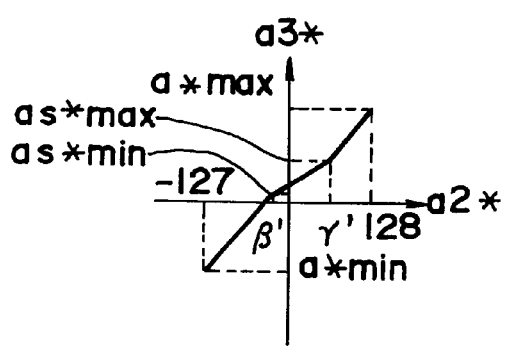
Figure 34C:
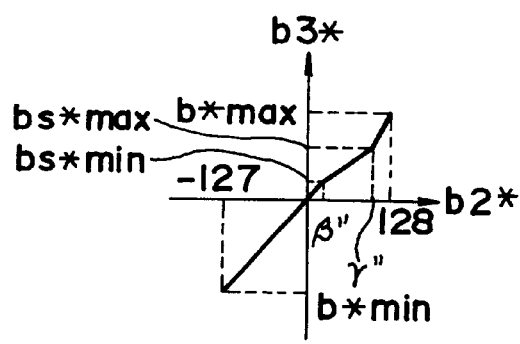

When color space optimization process (3) has been executed by color space optimization process unit 603, the color space reverse optimization process (3) is executed by color space reverse optimization process unit 605 (step S830 in FIG. 27). FIG. 33 is a flow chart of the color space reverse optimization process (3). First, information relating to skin tone area set by a user (i.e., LS*max, LS*min, a*max, a*min, b*max, b*min) are read from hard disk 614 (step S831). Then, the maximum value L*max and minimum value L*min of luminance component L*, maximum value a*max and minimum value a*min of chromaticity component a*, and maximum value b*max and minimum value b*min of chromaticity component b* are read from hard disk 614 (step S832). The read values are used to restore the distribution of data of decoded luminance component L2*, chromaticity components a2* and b2* to the original L*max through L*min, a*max through a*min, and b*max through b*min (step S833). These processes are executed based on the graphs of FIGS. 34a through 34c. The L2* calculation unit 633 subjects the input luminance component L2* to the calculations of Equation 24 to restore luminance component L3* distributed from L*min through L*max. In Equation 24, the difference between L*max and L*min is designated LM, and the difference between Ls*max and Ls*min is designated LMs. a and b are values stored on hard drive 614 when color space optimization process (3) was executed.

$$L3^* = \frac{LM - LMs}{255 - (\gamma - \beta)} \times L2^* + L^*\min \quad (24)$$

where $0 \leq L2^* \leq \beta$ $$L3^* = \frac{L2^*}{\alpha} - \alpha \cdot Ls^*\max$$

where $\beta \leq L2^* \leq \gamma$ $$L3^* = \frac{LM - LMs}{255 - (\gamma - \beta)} \times L2^* + LMs + L^*\min$$

where $\gamma \leq L2^* \leq 255$

The chromaticity component a2* is used in the calculation of Equation 25 to restore chromaticity component a3 distributed from a*min through a*max. In Equation 25, the difference between a min and a*max is designated aM, and the difference between as*min and as*max is designated aMs. a' and b' are values stored on hard disk 614 when color space optimization process (3) was executed.

$$a3^* = \frac{aM - aMs}{255 - (\gamma' - \beta')} \times a2^*$$

where $0 \leq a2^* \leq \beta'$ $$a3^* = \frac{a2^*}{\alpha} - \alpha \cdot as^*\max - as^*\min$$

where $\beta' \leq a2^* \leq \gamma'$ $$a3^* = \frac{aM - aMs}{255 - (\gamma' - \beta')} \times a2^* + aMs$$

where $\gamma' \leq a2^* \leq 255$

The chromaticity component b2* is used in the calculation of Equation 26 to restore chromaticity component b3 distributed from b*min through b*max. In Equation 26, the difference between b*min and b*max is designated bM, and the difference between bs*min and bs*max is designated bMs. a" and b" are values stored on hard disk 614.

$$b3^* = \frac{bM - bMs}{255 - (\gamma'' - \beta'')} \times b2^*$$

where $0 \leq b2^* \leq \beta''$ $$b3^* = \frac{b2^*}{\alpha} - \alpha \cdot bs^* \max - b^* \min$$

where $\beta'' \leq b2^* \leq \gamma''$ $$b3^* = \frac{bM - bMs}{255 - (\gamma'' - \beta'')} \times b2^* + bMs$$

where $\gamma'' \leq b2^* \leq 255$ (3-3-3-4) Color Space Reverse Optimization Process (4)

Figure 35:
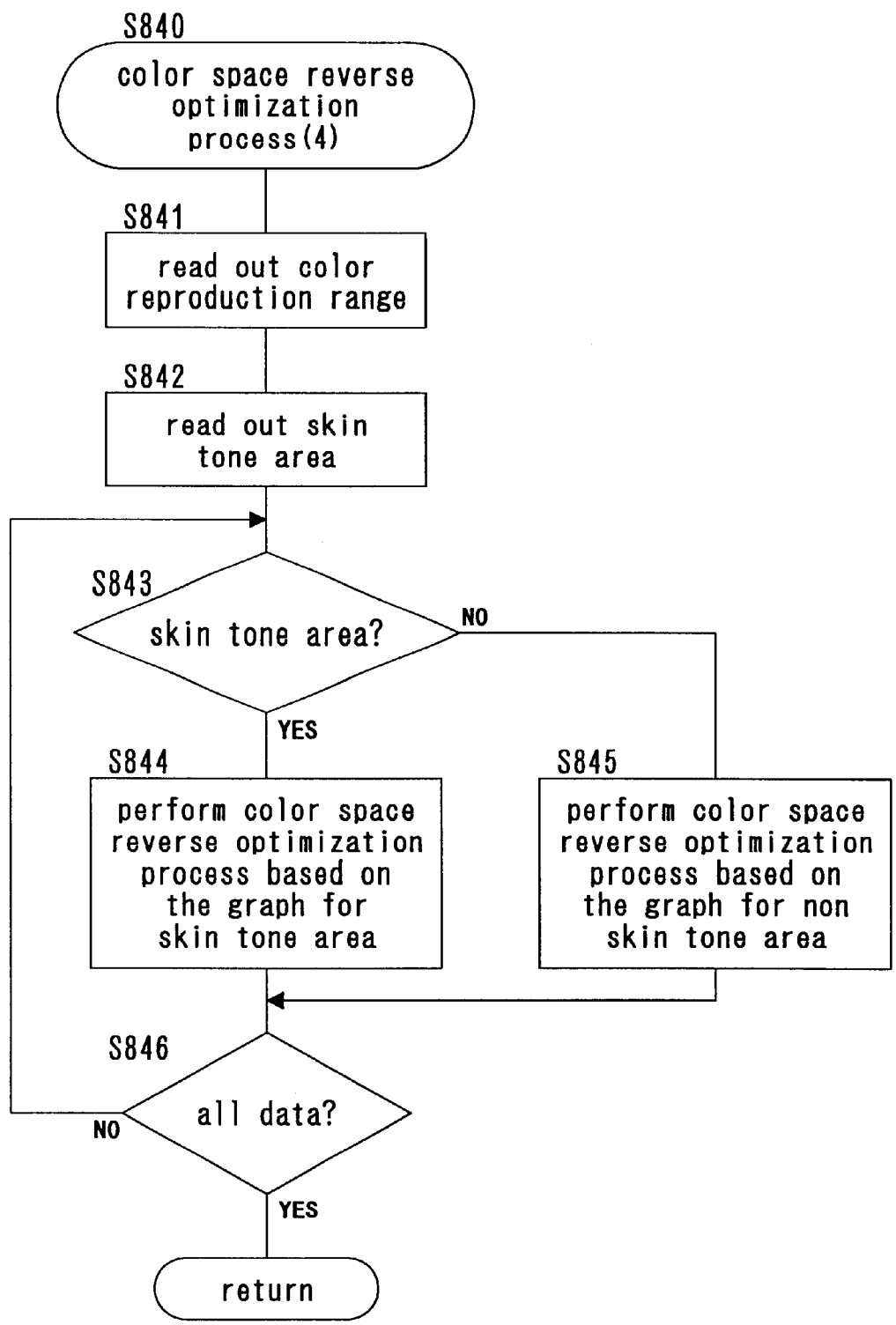
FIG. 35 is a flow chart of the color space reverse optimization process (4)
Figure 36A:
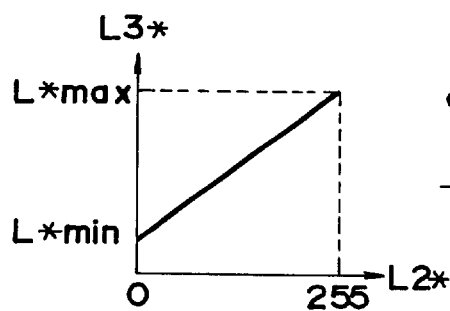
FIGS. 36a through 36f are graphs used in color space reverse optimization process (4).
Figure 36B:
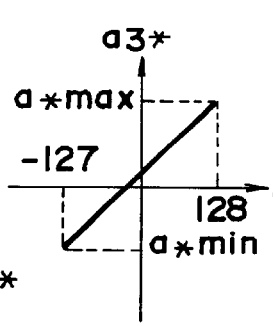
Figure 36C:
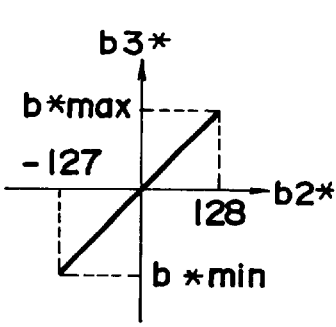
Figure 36D:
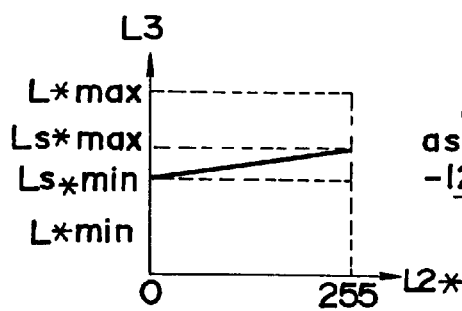
Figure 36E:
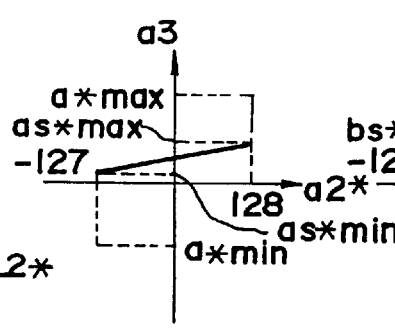
Figure 36F:
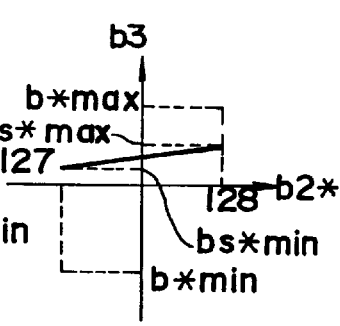

When color space optimization process (4) has been executed by color space optimization process unit 603, the color space reverse optimization process (4) is executed by color space reverse optimization process unit 605 (step S840 in FIG. 35). FIG. 35 is a flow chart of the color space reverse optimization process (4). First, information relating to skin tone area set by a user (i.e., Ls*max, Ls*min, a*max, a*min, b*max, b*min) are read from hard disk 614 (step S841). Then, the maximum value L*max and minimum value L*min of luminance component L*, maximum value a*max and minimum value a*min of chromaticity component a*, and maximum value b*max and minimum value b*min of chromaticity component b* are read from hard disk 614 (step S842). When the input data are determined to be related to a skin tine area via the address of the pixel related to a skin tone area stored in skin tone area memory unit 623 (step S843: YES), the distribution of data of decoded luminance component L2*, chromaticity components a2* and b2* are restored to the original Ls*max through Ls*min, as*max through as*min, and bs*max through bs*min (step S843). These processes are executed based on the graphs of FIGS. 36*d* through 36*f*. The L2* calculation unit 633 subjects the input luminance component L2* to the calculations of Equation 27 to restore luminance component L3* distributed from Ls*max through Ls*min.

$$L3^* = (Ls^*\max - Ls^*\min)/255 \times L2^* + Ls^*\min \tag{27}$$

The chromaticity component a* is subjected of the calculation of Equation 28 to restore the chromaticity component a3* distributed from as(min through as*max.

$$a3^* = (as^*\max - as^*\min)/255 \times (a2^* + 127) + as^*\min \tag{28}$$

The chromaticity component b* is subjected to calculation of Equation 29 to restore chromaticity component b3* distributed from bs*min through bs*max.

$$b3^* = (bs^*\max - bs^*\min)/255 \times (b2^* + 127) + bs^*\min \tag{29}$$

When the input data are image data of an area outside the skin tone area (step S843: NO), the distribution of the decoded luminance component L2*, and chromaticity components a2* and b2* are restored to the original distribution state of Lmin through L*max, a*min through a*max, and b*min through b*max (step S845). These processes execute calculations based on the graphs of FIGS. 36*a* through 36*c*. The L2* calculation unit 633 subjects the input luminance component L2* to calculations shown in Equation 30 to restore the luminance component L3* distributed from L*max through L*min.

$$L3^* = (L^*\max - L^*\min)/255 \times L2^* + L^*\min \tag{30}$$

The a2* calculation unit 634 subjects the input chromaticity component a* to the calculations of Equation 31 to restore a3* distributed from a*max through a*min.

$$a3^* = (as^*\max - as^*\min)/255 \times (a2^* + 127) + as^*\min \tag{31}$$

The b2* calculation unit 635 subjects the input chromaticity component b* to the calculation of Equation 32 to restore chromaticity component b3* distributed from b*max through b*min.

$$b3^* = (bs^*\max - bs^*\min)/255 \times (b2^* + 127) + bs^*\min \tag{32}$$

After the previously described processes have been executed for all input data (step S846: YES), the process ends and returns to the main routine.

In the image processing apparatus of the present invention, optimization processes correct the shift in distribution of data of the luminance components and chromaticity components after the document RGB image data have been converted to luminance components and chromaticity components and before the encoding process is executed by the encoding process unit, so as to redistribute the data from a minimum value to a maximum value of the various data in the color space. Thus, dispersion and loss of minute data can be prevented between pixels caused by the encoding process of the encoding process unit and the decoding process of the decoding process unit.

In a more desirable image processing apparatus, luminance component and chromaticity component data of skin tone areas set by a setting means are optimized within a wider range than data of other areas. Thus, the reproducibility of skin tone area are particularly improved. The reproducibility of skin tone areas are also improved because the luminance component and chromaticity components data of the skin tone area are optimized separately from the data of other areas.

In a modification of the image processing apparatus of the present invention, the chromaticity component data of pixels having luminance component values in a predetermined range are optimized individually by the optimization process unit. Thus, reproducibility can be improved, for example, for the chromaticity components of areas having high values for their luminance component or areas having low values for their luminance component.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus, comprising:
   means for receiving image data that include a predetermined number of bits;
   means for detecting an actual range of the received image data; and
   means for converting the received image data into converted image data so that a range of the converted image data corresponds to a full range enabled by the predetermined number of bits.

2. The image processing apparatus of claim 1, wherein the predetermined number of bits is capable of expressing a predetermined number of data values and a difference between a minimum value of the converted image data and a maximum value of the converted image data equals the predetermined number of data values.

3. The image processing apparatus of claim 2, wherein a minimum value of the converted image data is set to zero and a maximum value of the converted image data is set to a maximum value expressable by the predetermined number of bits.

4. The image processing apparatus of claim 3, wherein the image data is luminance data.

5. The image processing apparatus of claim 1 wherein the image data is one of luminance data and chromaticity data.

6. The image processing apparatus of claim 1 further comprising means for encoding the converted image data into encoded image data.

7. The image processing apparatus of claim 6, wherein the encoding means uses a BGTC type encoding process.

8. The image processing apparatus of claim 6, further comprising:
means for decoding the encoded image data into decoded image data; and
means for restoring a range of the decoded image data into the actual range of the received image data.

9. The image processing apparatus of claim 8, wherein the predetermined number of bits is eight.

10. An image processing apparatus comprising:
means for receiving color image data;
means for setting a first range of color data values; and
means for converting the color image data within the first color range into converted color image data having a second range of color data values that is greater than the first range of color data values.

11. The image processing apparatus of claim 10, wherein the image data is expressed by a predetermined number of bits and the second range of color data values is a maximum range of values enabled by the predetermined number of bits.

12. The image processing apparatus of claim 11, wherein the predetermined number of bits is eight.

13. The image processing apparatus of claim 10, further comprising means for converting the received color image data that is not within the first range into converted image data having a gradation lower than a gradation of the converted color image data.

14. The image processing apparatus of claim 13, further comprising means for encoding all of the converted image data into encoded data.

15. The image processing apparatus of claim 14, wherein the encoding means uses a GBTC type encoding process.

16. The image processing apparatus of claim 14, further comprising:
means for decoding the encoded image data into decoded image data; and
means for restoring a range of the decoded image data into the first range of the received image data.

17. An image processing apparatus comprising:
means for receiving image data having a first range of data values;
means for setting a minimum set value and a maximum set value of the received image data;
means for selecting the received image data that is equal to or between the minimum set value and the maximum set value; and
means for converting the selected image data into converted image data having a second range of data values that is greater than the first range of data values.

18. The image processing apparatus of claim 17, wherein the image data is expressed by a predetermined number of bits and the second range of data values is a maximum range of values enabled by the predetermined number of bits.

19. The image processing apparatus of claim 17, further comprising means for converting the received image data that was not selected into converted image data.

20. The image processing apparatus of claim 17, wherein the minimum set value and the maximum set value are determined by luminance and chromaticity.

21. The image processing apparatus of claim 20, wherein the minimum set value and the maximum set value define a range of skin tone.

22. An image processing apparatus, comprising:
means for receiving color image data;
first means for converting the color image data into luminance data and first chromaticity data; and
second means for converting first the chromaticity data from a first range into converted chromaticity data having a second range of values that is greater than the first range.

23. The image processing apparatus of claim 22, further comprising means for encoding the amended image data into encoded image data.

24. The image processing apparatus of claim 23, wherein the encoding means uses a GBTC type encoding process.

25. The image processing apparatus of claim 23, further comprising:
means for decoding the encoded image data into decoded image data; and
means for restoring a range of the decoded image data into the actual range of the received color image data.

26. The image processing apparatus of claim 22, wherein the converted chromaticity data is expressed by a predetermined number of bits and the second range of values is a maximum range of values enabled by the predetermined number of bits.

27. The image processing apparatus of claim 26, wherein at each level of luminance data there is a corresponding range of chromaticity data, and the second converting means converts each of the corresponding ranges of chromaticity data into the second range.

28. An image processing apparatus, comprising:
means for receiving image data that include a predetermined number of bits;
means for detecting an actual range of the received image data; and
means for converting the received image data into converted image data having a second range that is greater than the actual range.

* * * * *